(12) United States Patent
Yoneyama et al.

(10) Patent No.: US 8,325,296 B2
(45) Date of Patent: Dec. 4, 2012

(54) LIGHT-TRANSMITTING SUBSTRATE, OPTICAL FILM, POLARIZING PLATE AND IMAGE DISPLAY DEVICE

(75) Inventors: Hiroyuki Yoneyama, Minami-Ashigara (JP); Jun Watanabe, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 391 days.

(21) Appl. No.: 12/749,701

(22) Filed: Mar. 30, 2010

(65) Prior Publication Data
US 2010/0245722 A1 Sep. 30, 2010

(30) Foreign Application Priority Data

Mar. 30, 2009 (JP) ................................. 2009-083791
Mar. 30, 2009 (JP) ................................. 2009-083793

(51) Int. Cl.
*G02F 1/1335* (2006.01)
*G02B 5/02* (2006.01)
*G02B 5/30* (2006.01)
*B32B 3/30* (2006.01)
*B32B 5/02* (2006.01)

(52) U.S. Cl. ............ 349/84; 349/158; 349/160; 349/96; 359/599; 359/485.01; 428/172

(58) Field of Classification Search .................. 349/158, 349/160, 166, 84, 96, 99; 428/172, 147, 428/143; 359/599, 485.01, 485.03; 264/1.6
See application file for complete search history.

(56) References Cited

U.S. PATENT DOCUMENTS

| | | |
|---|---|---|
| 2005/0063066 A1 | 3/2005 | Namioka et al. |
| 2006/0233972 A1 | 10/2006 | Muramatsu et al. |
| 2008/0130123 A1 | 6/2008 | Namioka et al. |
| 2008/0174875 A1 | 7/2008 | Iwata et al. |
| 2009/0087617 A1 | 4/2009 | Suzuki et al. |
| 2010/0245722 A1* | 9/2010 | Yoneyama et al. ............. 349/84 |

FOREIGN PATENT DOCUMENTS

| | | |
|---|---|---|
| JP | H11-002706 A | 1/1999 |
| JP | 2000-075134 A | 3/2000 |

(Continued)

OTHER PUBLICATIONS

Notice of Reasons for Rejection issued in corresponding Japanese Patent Application No. 2009083791 dated Sep. 11, 2012 with English Translation.

(Continued)

*Primary Examiner* — Brian Healy
(74) *Attorney, Agent, or Firm* — Buchanan Ingersol & Rooney PC

(57) ABSTRACT

A light-transmitting substrate has an uneven profile on at least one surface thereof, the light-transmitting substrate contains a thermoplastic resin and a flat translucent particle; a tilt angle of the uneven profile on at least one surface of the light-transmitting substrate has the following distribution:
  (a) an integral value of frequencies of from 0° to less than 1.0° is from 0% to less than 25%,
  (b) an integral value of frequencies of from 1.0° to less than 10° is from 60% to less than 100%, and
  (c) an integral value of frequencies of 10° or more is from 0% to less than 25%,
and
  an average distance between trough and crest in the uneven profile is from 10 to 300 μm.

16 Claims, 2 Drawing Sheets

FOREIGN PATENT DOCUMENTS

| | | |
|---|---|---|
| JP | 2000-258612 A | 9/2000 |
| JP | 2001-172403 A | 6/2001 |
| JP | 2001-281402 A | 10/2001 |
| JP | 2003-025504 A | 1/2003 |
| JP | 2003-121620 A | 4/2003 |
| JP | 2005-092197 A | 4/2005 |
| JP | 2006-276839 A | 10/2006 |
| JP | 2007-057866 A | 3/2007 |
| JP | 2007-164151 | 6/2007 |
| JP | 2007-187971 A | 7/2007 |
| JP | 2008-203835 A | 9/2008 |
| JP | 2008-287072 A | 11/2008 |
| JP | 2009-036984 | 2/2009 |
| JP | 2009-098666 A | 5/2009 |
| WO | WO 2009001911 A1 | 12/2008 |

OTHER PUBLICATIONS

Office Action issued in corresponding Japanese Patent Application No. 2009-083793 dated Sep. 18, 2012 and English translation.

* cited by examiner

LIGHT-TRANSMITTING SUBSTRATE, OPTICAL FILM, POLARIZING PLATE AND IMAGE DISPLAY DEVICE

CROSS-REFERENCE TO RELATED APPLICATIONS

This application claims the benefit of Japanese Patent Application JP 2009-083791, filed Mar. 30, 2009, and Japanese Patent Application JP 2009-083793, filed Mar. 30, 2009, the entire contents of which are hereby incorporated by reference, the same as if set forth at length.

FIELD OF THE INVENTION

The present invention relates to a light-transmitting substrate having unevenness on the surface, a production method thereof, an optical film, a polarizing plate and an image display device.

BACKGROUND OF THE INVENTION

In recent years, a liquid crystal display device (LCD) has been widely used because of its thinness, lightweight and low power consumption. The liquid crystal display device contains a liquid crystal cell and a polarizing plate. The polarizing plate is usually composed of a protective film and a polarizing film and is obtained by dyeing a polarizing film formed from a polyvinyl alcohol film with iodine, stretching the film, and stacking a protective film on both surfaces thereof. In a transmission-type liquid crystal display, this polarizing plate is attached to both sides of a liquid crystal cell and one or more optical compensation sheets are sometimes further disposed thereon. Also, in a reflection-type liquid crystal display device, a reflector, a liquid crystal cell, one or more optical compensation sheets and a polarizing plate are usually disposed in order.

LCD is not a self-light-emitting type display device and requires a surface light source. As for the form of the surface light source, a backlight type where a uniform surface light source is obtained by placing a member having a light diffusing ability, such as diffusion sheet or prism sheet, to intervene between a liquid crystal cell and a light emission source, is widely used, and a cold-cathode tube (CCFL) or LED is used as the light emitting source. Also, in some LCD, there is known a type where a light source is disposed in the edge part of a light guide plate and combined with a diffusion sheet, a prism sheet or the like to work as a surface light source (edge light type). In these types, generally, a line light source or a point light source is converted into a surface light source as described above and therefore, a uniform surface light source is obtained using a diffusion sheet.

Out of the members of a backlight for obtaining a surface light source, the diffusion sheet is generally disposed between a backlight and a polarizing plate on the backlight side. By disposing a diffusion sheet, reduction of luminance unevenness and surface uniformization of display characteristics are achieved (JP-A-2000-75134 (the term "JP-A" as used herein means an "unexamined published Japanese patent application")) and at the same time, production of an interference fringe such as moiré due to interference of incident light with a pixel in the liquid crystal cell can be suppressed.

However, attempts are being recently made to decrease the number of members of a liquid crystal display device or for affording low power consumption, to decrease the number of fluorescent lamps utilized as the light source. In addition, since thinning of LCD allows for a small distance between the backlight source and the diffusion sheet, it becomes difficult for a conventional diffusion film to achieve uniform light diffusion. Accordingly, in order to gain the distance as much as possible, a backlight-side polarizing plate having diffusibility on its surface has been put into use as a substitute for the diffusion sheet.

For example, in JP-A-2000-75134, a light-diffusive polarizing plate with a light diffusion layer having predetermined properties and containing a porous amorphous particle and a spherical particle in a dispersed state has been proposed, and it is disclosed that a light diffusion sheet can be thereby dispensed with. Also, in JP-A-2001-172403 and JP-A-2003-25504, a production method of a light diffusion film, including casting a fine particle-containing dope on a support, has been proposed, and it is disclosed that according to this method, a light diffusion film excellent in the optical isotropy and the like can be obtained.

In addition, it has been proposed that an ellipsoidal particle can be used for a film having light diffusibility. For example, in JP-A-2000-258612, a forward scattering film containing a flat particle (a particle in a rotated ellipsoidal, discotic, rugby-ball or the like shape) is described, and it is disclosed that when this film is incorporated into a reflection type liquid crystal display device, the forward scattering function and visibility are greatly enhanced. In JP-A-2001-281402, as regards an antiglare film comprising a transparent support having formed thereon an antiglare layer, where the apex angle of the antiglare layer surface is specified, an embodiment using a flat particle is described, and it is disclosed that an antiglare film ensuring little whitish tint and high sharpness of transmitted image is obtained. In JP-A-2008-287072, it is disclosed that when a flat translucent particle is used in a hardcoat layer composed of a curable resin and an aggregating inorganic particle is used in combination, an antiglare film assured of antiglare property and front contrast and free from glaring can be obtained.

SUMMARY OF THE INVENTION

However, the light diffusion films described in JP-A-2000-75134, JP-A-2001-172403 and JP-A-2003-25504 are low in the total light transmittance and when the film is used in an image display device, this may cause reduction of the front white luminance. Also, a large amount of fine particles must be contained in the film so as to ensure sufficient diffusibility and therefore, a trouble of generating a secondary coarse particle due to aggregation of fine particles may be readily caused. In addition, when the haze is decreased, that is, the total light transmittance is raised so as to suppress the reduction of front contrast, deterioration of the uniformity of surface screen (e.g., unevenness of backlight) or production of an interference fringe such as moiré may not be prevented from occurring.

The forward scattering film described in JP-A-2000-258612 cannot succeed in obtaining a surface profile necessary for providing surface uniformity or suppressing an interference fringe such as moiré, because the condition of flat particles in the thermoplastic resin is not controlled. Also, the film assured of little whitish tint and high sharpness of transmitted image as in the antiglare film described in JP-A-2001-281402 is insufficient in the surface uniformity or suppression of an interference fringe such as moiré. In the case of the antiglare film described in JP-A-2008-287072 where a hard-coat layer composed of a curable resin containing a flat particle is provided on a light-transmitting substrate and an aggregating inorganic particle is used in combination with the flat particle, when the film is used as an antiglare film, the control range of surface form or internal scattering property is wide, but the layer construction is complicated.

In addition, the light diffusion film using a fine particle has a problem in the durability when it is used for the backlight or when the temperature change is repeated at the lighting-on or lighting-off of the backlight.

An object of the present invention is to provide a light-transmitting substrate and a polarizing plate, which are assured of high durability and contribute to excellent uniformity of the display screen and thickness reduction in an image display device such as liquid crystal display device, and provide a method capable of simply and easily producing the light-transmitting substrate.

Another object of the present invention is to provide an image display device capable of ensuring high front white luminance that is at the same time uniform in the screen, suppressing an interference fringe such as moiré, and responding to the thickness reduction.

The above-described objects can be attained by the following constructions.

A light-transmitting substrate having an uneven profile on at least one surface, wherein the light-transmitting substrate is formed of a thermoplastic resin and contains a flat translucent particle;

the tilt angle of the uneven profile on at least one surface of the light-transmitting substrate has the following distribution:

(a) the integral value of frequencies of from 0° to less than 1.0° is from 0% to less than 25%, (b) the integral value of frequencies of from 1.0° to less than 10° is from 60% to less than 100%, and (c) the integral value of frequencies of 10° or more is from 0% to less than 25%, and the average distance Sm between the trough and the crest in the uneven profile is from 10 to 300 μm.

The first preferable aspect of the present invention includes the following (1) to (10).

(1) A light-transmitting substrate having an uneven profile on at least one surface, wherein the light-transmitting substrate is formed of a thermoplastic resin and contains a flat translucent particle;

the tilt angle of the uneven profile on at least one surface of the light-transmitting substrate has the following distribution:

(a) the integral value of frequencies of from 0° to less than 1.0° is from 0% to less than 25%, (b) the integral value of frequencies of from 1.0° to less than 10° is from 60% to less than 100%, and (c) the integral value of frequencies of 10° or more is from 0% to less than 25%, the average distance Sm between the trough and the crest in the uneven profile is from 10 to 300 μm, and the flat particle satisfies the following condition:

$$0.40 \leq L/d \leq 1.90 \quad (f)$$

wherein L and d indicate the followings:

L: the thickness of the flat particle-containing region in the light-transmitting substrate, and d: the long axis length of the flat particle.

(2) The light-transmitting substrate as described in (1) above, wherein the aspect ratio of the flat translucent particle is from 1.2 to 50 and the long axis length is from 1.5 to 50 μm.

(3) The light-transmitting substrate as described in (1) or (2) above, wherein the scattering angle distribution of the light-transmitting substrate satisfies the following condition:

$$I(4°)/I0 = \text{from 0.02 to 0.06} \quad (g)$$

wherein I(4°) and I0 each is the intensity of outgoing light transmitted through the light-transmitting substrate when light is caused to enter from the normal direction of the light-transmitting substrate, I(4°) is the outgoing light intensity at the position inclined at 4° from the normal line of the light-transmitting substrate when the light-transmitting substrate contains the translucent particle, and I0 is the outgoing light intensity in the normal direction of the light-transmitting substrate when the light-transmitting substrate does not contain the translucent particle.

(4) The light-transmitting substrate as described in any one of (1) to (3) above, wherein the haze value attributable to the interior is from 0.1 to 35% and the haze value attributable to the surface is from 3 to 40%.

(5) An optical film having a curable resin layer with a thickness of 0.1 to 15 μm on the light-transmitting substrate described in any one of (1) to (4).

(6) A method for producing the light-transmitting substrate described in any one of (1) to (4) above, the method comprising:

a step of casting a dope containing a thermoplastic resin, a flat translucent particle and a solvent on a support, and separating and then drying the cast film.

(7) A method for producing the light-transmitting substrate described in any one of (1) to (4), the method comprising:

a step of simultaneously or sequentially casting two or more kinds of dopes on a support, and separating and then drying the cast film, wherein at least any one of the two or more kinds of dopes contains a thermoplastic resin and a flat translucent particle.

(8) A method for producing the light-transmitting substrate described in any one of (1) to (4), the method comprising:

a step of mixing a thermoplastic resin and a flat translucent particle, and a step of melt-extruding the mixture and stretching the extruded film.

(9) A polarizing plate comprising a polarizing film and a protective film on at least one side of the polarizing film, wherein the protective film is the light-transmitting substrate described in any one of (1) to (4) above or the optical film described in (5) above.

(10) An image display device having any one of the light-transmitting substrate described in any one of (1) to (4) above, the optical film described in (5) above, and the polarizing plate described in (9) above.

According to the first preferable aspect of the present invention, a light-transmitting substrate and a polarizing plate, which contribute to excellent uniformity of the display screen and thickness reduction in an image display device such as liquid crystal display device, and a method capable of simply and easily producing a light-transmitting substrate having such performance, can be provided.

Also, according to the first preferable aspect of the present invention, an image display device capable of ensuring high front white luminance that is at the same time uniform in the screen, suppressing an interference fringe such as moiré, and responding to the thickness reduction, can be provided.

The second preferable aspect of the present invention includes the following (1) to (14).

(1) A light-transmitting substrate having an uneven profile on at least one surface, wherein the light-transmitting substrate is formed of a thermoplastic resin and contains a crosslinkable flat translucent particle having an average aspect ratio of 1.2 to 50;

the tilt angle of the uneven profile on at least one surface of the light-transmitting substrate has the following distribution:

(a) the integral value of frequencies of from 0° to less than 1.0° is less than 25%, (b) the integral value of frequencies of from 1.0° to less than 10° is from 60% to less than 100%, and (c) the integral value of frequencies of 10° or more is from 0% to less than 25%, the average distance Sm between the trough and the crest in the uneven profile is from 10 to 300 the flat translucent particle comprises a copolymer of a monofunctional monomer and a crosslinkable monomer, and the ratio of the crosslinkable monomer to all monomers is from 1 to 25 mass %.

(2) A light-transmitting substrate having an uneven profile on at least one surface, wherein the light-transmitting substrate is formed of a thermoplastic resin and contains a crosslinkable flat translucent particle having an average aspect ratio of 1.2 to 50;

the tilt angle of the uneven profile on at least one surface of the light-transmitting substrate has the following distribution:

(a) the integral value of frequencies of from 0° to less than 1.0° is less than 25%, (b) the integral value of frequencies of from 1.0° to less than 10° is from 60% to less than 100%, and (c) the integral value of frequencies of 10° or more is from 0% to less than 25%, the average distance Sm between the trough and the crest in the uneven profile is from 10 to 300 μm, the flat translucent particle comprises a copolymer of a monofunctional monomer and a crosslinkable monomer, and the expansion coefficient in toluene is from 20 to 100 vol %.

(3) A light-transmitting substrate having an uneven profile on at least one surface, wherein the light-transmitting substrate is formed of a thermoplastic resin and contains a crosslinkable flat translucent particle having an average aspect ratio of 1.2 to 50;

the tilt angle of the uneven profile on at least one surface of the light-transmitting substrate has the following distribution:

(a) the integral value of frequencies of from 0° to less than 1.0° is less than 25%, (b) the integral value of frequencies of from 1.0° to less than 10° is from 60% to less than 100%, and (c) the integral value of frequencies of 10° or more is from 0% to less than 25%, the average distance Sm between the trough and the crest in the uneven profile is from 10 to 300 μm, the flat translucent particle comprises a copolymer of a monofunctional monomer and a crosslinkable monomer, the ratio of the crosslinkable monomer to all monomers is from 1 to 25 mass %,
and the expansion coefficient in toluene is from 20 to 100 vol %.

(4) The light-transmitting substrate as described in any one of (1) to (3) above, wherein the scattering angle distribution of the light-transmitting substrate satisfies the following condition:

$$I(4°)/I0 = \text{from } 0.02 \text{ to } 0.06 \tag{g}$$

wherein $I(4°)$ and $I0$ each is the intensity of outgoing light transmitted through the light-transmitting substrate when light is caused to enter from the normal direction of the light-transmitting substrate, $I(4°)$ is the outgoing light intensity at the position inclined at 4° from the normal line of the light-transmitting substrate when the light-transmitting substrate contains the translucent particle, and $I0$ is the outgoing light intensity in the normal direction of the light-transmitting substrate when the light-transmitting substrate does not contain the translucent particle.

(5) The light-transmitting substrate as described in any one of (1) to (4) above, wherein the haze value attributable to the interior is from 0 to 30% and the haze value attributable to the surface is from 3 to 30%.

(6) The light-transmitting substrate as described in any one of (1) to (5) above, wherein the monofunctional monomer is an aromatic monovinyl compound, a vinyl cyanide compound, an acrylic acid ester monomer, a methacrylic acid ester monomer, a mono- or di-carboxylic acid, an acid anhydride of a dicarboxylic acid, an amide-based monomer, a vinyl acetate, a hydroxyethyl vinyl ether or a hydroxybutyl vinyl ether.

(7) The light-transmitting substrate as described in any one of (1) to (6) above, wherein the crosslinkable monomer is an aromatic monomer, an oxygen-containing monomer, a sulfur-containing monomer, an aliphatic monomer, or an ester compound of a polyhydric alcohol and an acrylic acid or methacrylic acid.

(8) An optical film having a curable resin layer with a thickness of 0.1 to 15 μm on the light-transmitting substrate described in any one of (1) to (7) above.

(9) A method for producing a light-transmitting substrate, comprising casting a dope containing a thermoplastic resin, a crosslinkable translucent particle and a solvent on a support, and separating and drying the cast film to deform the crosslinkable translucent particle into a flat particle, wherein the average aspect ratio of the flat particle in the light-transmitting substrate is from 1.2 to 50.

(10) A method for producing the light-transmitting substrate described in any one of (1) to (3) above, the method comprising casting a dope containing a thermoplastic resin, a crosslinkable translucent particle and a solvent on a support, and separating and then drying the cast film.

(11) The method for producing the light-transmitting substrate as described in (10) above, wherein the light-transmitting substrate uses at least two or more kinds of dopes, the dopes are simultaneously or sequentially cast on a support, and the cast film is separated and dried to produce a light-transmitting substrate, and wherein at least one dope contains a thermoplastic resin and a crosslinkable translucent particle.

(12) A method for producing the light-transmitting substrate described in any one of (1) to (3) above, the method comprising mixing a thermoplastic resin and a crosslinkable translucent particle, melt-extruding the mixture, and stretching the extruded film.

(13) A polarizing plate comprising a polarizing film and a protective film on at least one side of the polarizing film) above, wherein the protective film is the light-transmitting substrate described in any one of (1) to (7) above or the optical film described in (8) above.

(14) An image display device having any one of the light-transmitting substrate described in any one of (1) to (7) above, the optical film described in (8) above, and the polarizing plate described in (13) above.

The light-transmitting substrate of the second preferable aspect of the present invention is used as a protective film of the backlight-side polarizing plate of a liquid crystal display device, whereby an image display free from reduction of white luminance at the front and production of moiré and assured of high luminance uniformity can be obtained. Also, the light-transmitting substrate, the optical film, the polarizing plate and the image display device, obtained by the present invention, have good durability.

DESCRIPTION OF REFERENCE NUMERALS AND SIGNS

| | |
|---|---|
| 1 | Light source |
| 2 | Fluorescent tube |
| 3 | Lower diffusion sheet |
| 4 | Light collecting sheet |
| 5 | Upper diffusion sheet |
| 6 | Polarizing plate |
| 7 | Liquid crystal cell |
| 8 | Base plate |
| 9 | Light-transmitting substrate having surface unevenness |

DETAILED DESCRIPTION OF THE INVENTION

The best mode for carrying out the present invention is described in detail below, but the present invention is not limited thereto. Incidentally, the expression "from (numerical value 1) to (numerical value 2)" as used in the present invention for indicating a physical value, a characteristic value or the like means "(numerical value 1) or more and (numerical value 2) or less". Also, the term "(meth)acrylate" as used in the present invention means "at least either acrylate or methacrylate". The same applies to "(meth)acrylic acid".

<Light-Transmitting Substrate>

The present invention is a light-transmitting substrate where the surface uneven profile of the light-transmitting substrate is formed into a specific configuration by using a flat translucent particle (hereinafter sometimes referred to as a "flat particle") and the light scattering property is thereby controlled. In particular, when the substrate is used as a protective film of a polarizing plate on the backlight side of a liquid crystal display device, an image display device capable of ensuring high front white luminance that is at the same time uniform in the screen, suppressing an interference fringe such as moiré, and responding to the thickness reduction can be provided. The best mode for carrying out the present invention is described in detail below, but the present invention is not limited thereto.

Figure 1A:
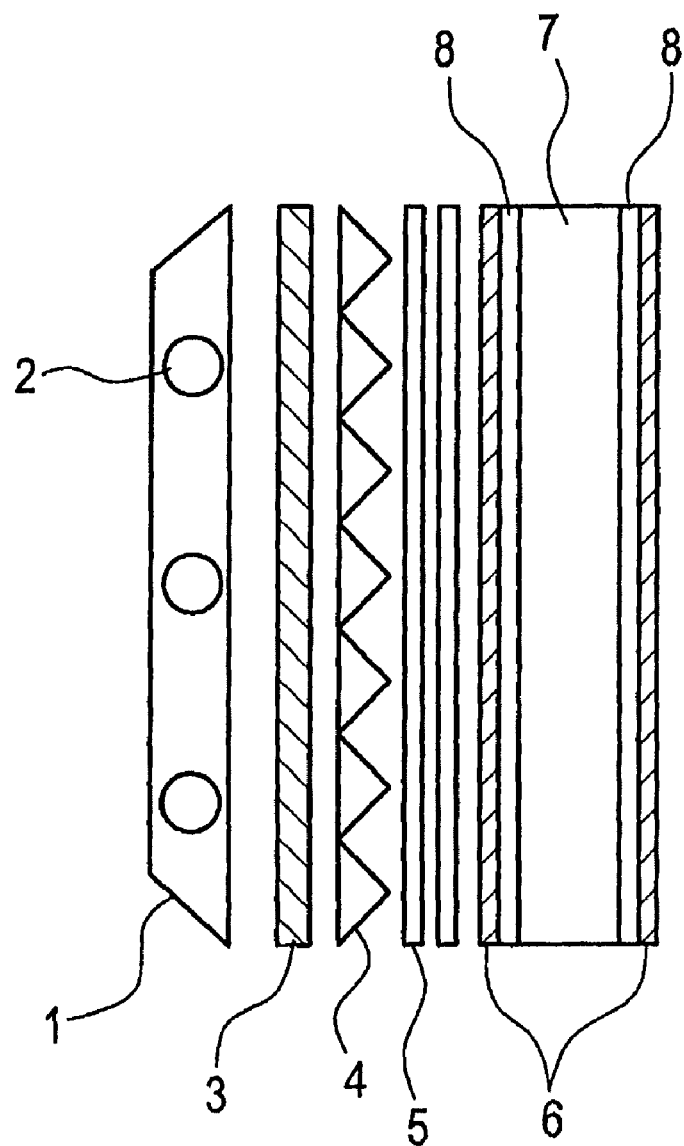
FIG. 1A is a schematic view showing one example of the conventional liquid crystal display device.

First, for the purpose of comparison, one example of the construction of a conventional liquid crystal display device is shown in FIG. 1A.

As shown in FIG. 1A, the conventional liquid crystal display device has a construction of [light source 1/light guide plate (fluorescent tube) 2/lower diffusion sheet 3/light collecting sheet 4 (e.g., prism sheet)/upper diffusion sheet 5/liquid crystal panel (lower polarizing plate 6/base plate 8/liquid crystal cell 7/base plate 8/upper polarizing plate 6)] from the light source side. The lower diffusion sheet 3 is an optical sheet having strong light diffusibility for reducing mainly the in-plane luminance unevenness of a backlight unit, and the light collecting sheet 4 is an optical sheet for collecting diffused light to the front direction of the liquid crystal display device (the normal direction of the display device plane). The upper diffusion sheet 5 is an optical sheet to reduce moiré that is generated due to a prism sheet as the light collecting sheet 4 or a periodic structure such as pixel in the liquid crystal cell 7, and further reduce the in-plane luminance unevenness that cannot be removed by the lower diffusion sheet 3.

Figure 1B:
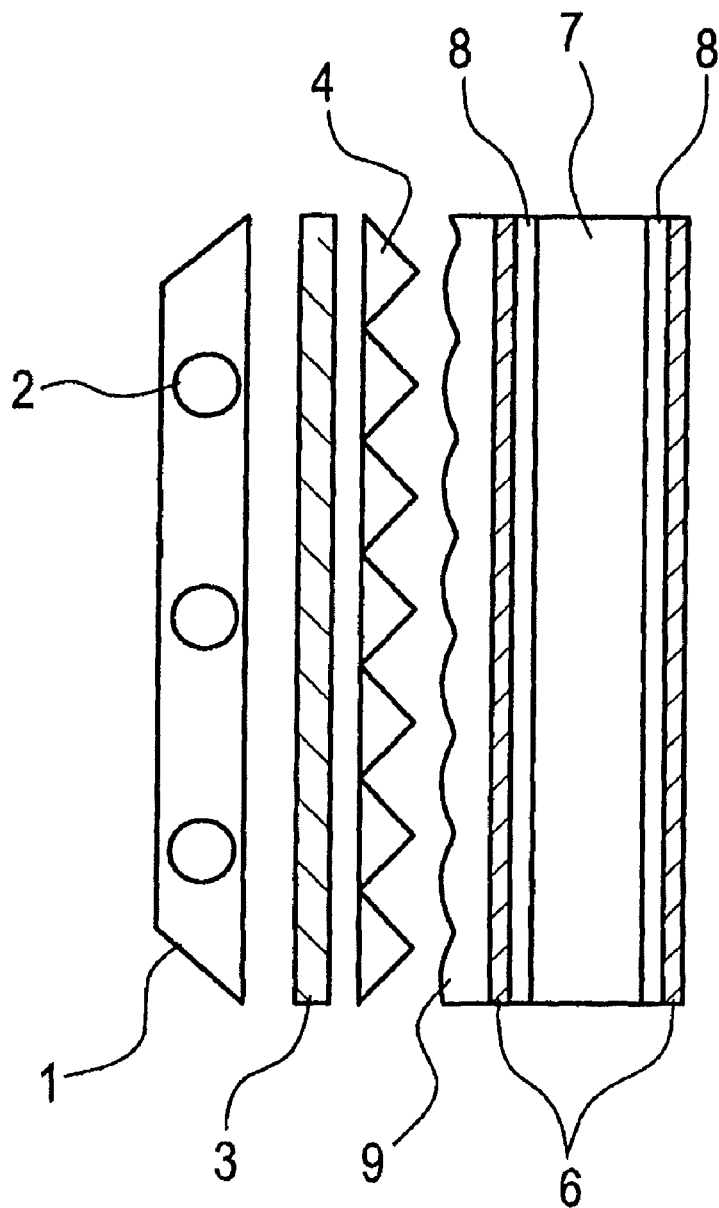
FIG. 1B is a schematic view showing one example of the liquid crystal display device of the present invention.

On the other hand, one example of the construction of the liquid crystal display device according to the present invention is shown in FIG. 1B. In the liquid crystal display device shown in FIG. 1B, a substrate imparted with light diffusibility (a light-transmitting substrate 9 having surface unevenness) is provided as a protective film of the lower polarizing 6, in place of the upper diffusion sheet 5. The light-transmitting substrate 9 having surface unevenness exerts a function equal to or greater than that of the upper diffusion sheet 5 and thanks to the construction above, not only moiré or in-plane luminance unevenness is reduced but also an effect of suppressing the reduction in front luminance or front contrast, which has been a problem of the upper diffusion sheet 5 or conventional techniques, is produced. Furthermore, removal of the upper diffusion sheet 5 enables making small the thickness of the entire liquid crystal display device, and the effect is higher than in the case of using a plurality of diffusion sheets 5. In principle, a thickness corresponding to the thickness of the removed diffusion sheet can be reduced.

More specifically, in the upper diffusion sheet 5 or conventional techniques, incident light is allowed to diffuse even into the wide angle range more than necessary, and the amount of light exited to the front direction is thereby relatively reduced. In the construction of the present invention, that is, in the liquid crystal display device where the light diffusion profile of a light-diffusing protective film attached to the lower polarizing plate is optimized, diffusibility high enough to reduce moiré or luminance unevenness without decreasing the amount of light exited to the front direction is imparted and therefore, the above-described problem can be overcome. The optimized light scattering profile of the optical film having light diffusibility changes when the properties of the backlight or lower diffusion sheet 3 are changed or these members are complexed together, but within the construction range above, the optical film can substantially exert the objective performance.

In some liquid crystal display devices, a luminance-enhancing film (for example, DBEF, produced by 3M) is used right below a lower polarizing plate and when a light-scattering film is disposed as a protective film of the lower polarizing plate, polarization is sometimes canceled to incur reduction in, the luminance-enhancing performance. However, the liquid crystal display device of the present invention uses an optical film small in the amount of wide-angle scattering components having high propensity to cancel the polarization, so that reduction in the luminance-enhancing performance can be minimized.

<Surface Profile of Light-Transmitting Substrate>

The light-transmitting substrate of the present invention is described below.

The light-transmitting substrate of the present invention has an uneven profile (tilted surface) on at least one surface and has a light scattering ability. In the following description, the surface on the side for governing the uneven profile to control light scattering is defined as surface A, and another surface is defined as surface B. First, the profile of surface A is described below. In the present invention, the tilt angle and its proportion of surface A are determined by the following method.

Envisaging apexes of a triangle having an area of 0.5 to 2 square micrometers on the light-transmitting substrate, three normal lines are extended upward vertically from those apexes (three normal lines on the substrate). A triangle is defined by three points at which three normal lines on the substrate intersect with the film surface, and the angle between the normal line on the plane of the thus-defined triangle and the normal line upward vertically extended from the substrate is defined as the tilt angle.

The method for determining the proportion of tilt angles is described below. The area of 250,000 square micrometers (0.25 square millimeters) or more on the substrate is divided into the above-described triangles, and individual tilt angles of all triangles are measured. The angle of gradient at each measuring point is determined, and the ratio of the number (frequency) of angles to the number of all measuring points is determined for each angle of gradient. This ratio is defined as the frequency of tilt angle. In the present invention, the integral value of frequencies of title angle in each of the ranges of from 0° to less than 1.0°, from 1.0° to less than 10.0°, and from 10.0° or more is determined. As for details of the measuring method, the method described in JP-A-2007-108724, page 6, paragraph 12 can be employed.

In the present invention, the measurement area on the substrate is preferably 250,000 square micrometers (0.25 square millimeters) or more, and in view of satisfying both the measurement accuracy and the measurement efficiency, preferably from 0.25 to 1.0 square millimeters. The area of the triangle as the measurement unit is preferably from 0.5 to 2 square micrometers from the standpoint of ensuring the measurement accuracy.

As for the measurement apparatus, some devices are known, but in the present invention, Model SXM520-AS150 manufactured by Micromap Corp. (U.S.A.) is used. In this apparatus, a halogen lamp having inserted thereinto an interference filter at a center wavelength of 560 nm is used as the light source and an objective lens having a magnification of 2.5 to 50 times is incorporated. The data is retrieved by a ⅔ inch standard-equipped CCD having a pixel number of 640× 480. In the present invention, the objective lens is set to 10 times, the measurement unit of the tilt angle is set to 0.8 square micrometers, and the measurement area is set to 500, 000 square micrometers (0.5 square millimeters). If desired, the magnification of the objective lens may be increased, and the measurement unit and measurement area may be accordingly decreased. The tilt angle distribution can be computed by analyzing the measurement data with a software such as MAT-LAB produced by Math Works, Inc. (U.S.A.). In the present invention, the tilt angle step is set to about 0.01°.

In the present invention, the tilt angle of surface A of the light-transmitting substrate needs to have the following distribution:

(a) the integral value of frequencies of from 0° to less than 1.0° is from 0% to less than 25%, (b) the integral value of frequencies of from 1.0° to less than 10° is from 60% to less than 100%, and (c) the integral value of frequencies of 10° or more is from 0% to less than 25%;

preferably the following tilt angle distribution:

(a) the integral value of frequencies of from 0° to less than 1.0° is from 2 to 20%, (b) the integral value of frequencies of from 1.0° to less than 10° is from 60 to 95%, and (c) the integral value of frequencies of 10° or more is from 1 to 20%.

In a more preferred title angle distribution:

(a) the integral value of frequencies of from 0° to less than 1.0° is from 3 to 15%, (b) the integral value of frequencies of from 1.0° to less than 10° is from 65 to 90%, and (c) the integral value of frequencies of 10° or more is from 1% to less than 16%, and in a still more preferred tilt angle distribution:

(a) the integral value of frequencies of from 0° to less than 1.0° is from 5 to 12%, (b) the integral value of frequencies of from 1.0° to less than 10° is from 65 to 80%, and (c) the integral value of frequencies of 10° or more is from 1% to less than 15%, or (a) the integral value of frequencies of from 0° to less than 1.0° is from 3 to 15%, (b) the integral value of frequencies of from 1.0° to less than 10° is from 65 to 80%, and (c) the integral value of frequencies of 10° or more is from 5% to less than 16%.

If the integral value of frequencies of the tilt angle of from 0° to less than 1.0° is 25% or more, the proportion of a smooth surface becomes excessively large and sufficient scattering cannot be obtained, whereas if the integral value of frequencies of from 1.0° to less than 10° is less than 60%, the proportion of a scattering component having an appropriate scattering angle and scarcely causing reduction of the front contrast is decreased. Also, if the integral value of frequencies of 10° or more is 25% or more, the proportion of a scattering component on the wide-angle side becomes too large and this causes reduction of the front contrast.

In the present invention, for imparting appropriate scattering property while scarcely reducing the front contrast, in addition to the above-described distributions, it is preferred to further satisfy the following tilt angle distribution:

(d) the integral value of frequencies of from 0° to less than 0.5° is from 0% to less than 11%, more preferably from 0% to less than 9%, and (e) the integral value of frequencies of from 3° to less than 8.0° is from 25 to 60%, and in a more preferred tilt angle distribution, (d) the integral value of frequencies of from 0° to less than 0.5° is from 1 to 8%, and (e) the integral value of frequencies of from 3° to less than 8.0° is from 30 to 55%.

The tilt angle distribution can be controlled, for example, by changing the shape or size (aspect ratio, long axis length or short axis length) of the flat particle added, setting the ratio between the thickness of the flat particle-containing region in the light-transmitting substrate and the long axis length of the flat particle to a specific range, adjusting the dope concentration in a solution-casting film-forming method, selecting the kind of the thermoplastic resin, or combining these methods.

The average trough-to-crest distance (Sm) of surface A of the light-transmitting substrate is from 10 to 300 μm, preferably from 20 to 200 μm, more preferably from 30 to 150 μm, still more preferably from 50 to 90 μm.

If the Sm value exceeds 300 μm, the distance between a trough and a crest becomes excessively wide, which makes it difficult to enhance the uniformity of backlight or eliminate moiré. Furthermore, when unevenness is imparted to the light-transmitting substrate surface by using the flat particle of the present invention, a surface profile with Sm of less than 10 is hardly obtained. In order to eliminate moiré of a liquid crystal display device, Sm is preferably not more than the pitch of the prism sheet on the backlight side or not more than 2 times the pixel pitch of the liquid crystal cell. The average trough-to-crest distance (Sm) can be measured in accordance with JIS-B-0601.

In the present invention, in addition to appropriately controlling the light scattering angle by the tilt angle distribution of surface A of the light-transmitting substrate, when the distance (Sm) between a trough and a crest is set to a fixed range, both the front contrast and the reduction of moiré or luminance unevenness can be satisfied.

The arithmetic mean roughness (Ra) on the surface of surface A of the light-transmitting substrate is preferably from 0.03 to 0.80 µm, more preferably from 0.05 to 0.70 µm, and most preferably from 0.05 to 0.50 µm. Within the range of arithmetic mean roughness (Ra) of the present invention, optical properties of the present invention are satisfied and at the same time, an adhesion trouble or the like with an adjacent component can be avoided when the substrate is used on the backlight side of a display device.

The arithmetic mean roughness (Ra) can be measured in accordance with JIS-B0601 (1994, 2001).

<Optical Properties of Light-Transmitting Substrate>

In consideration for the intensity of outgoing light (the intensity of outgoing light based on the intensity of incident light) transmitted through the light-transmitting substrate in causing light to enter from the normal direction of the light-transmitting substrate, assuming that the outgoing light intensity in the normal direction of the light-transmitting substrate when the substrate does not contain a translucent particle is I0 and the outgoing light intensity in the normal line of the surface of the light-transmitting substrate when the substrate contains a translucent particle is I(0°), the ratio to I0, that is, I(0°)/I0, is preferably from 0.4 to 1.0, more preferably from 0.45 to 0.80, and most preferably from 0.50 to 0.70. When the ratio is from 0.40 to 0.98, reduction of white luminance during white color emission is small and the display screen is advantageously kept from darkening.

It has been found that in order to maintain the front white luminance and the front contrast and at the same time, suppress moiré or in-plane luminance unevenness, the light scattering film is preferably a film where the ratio of light scattering intensity toward the low-angle side is large (strong forward scattering property) and the intensity of scattered light toward the vicinity of 2 to 6° with respect to straight-line light entering from the film normal line is relatively large as compared with scattered light to other angles. More specifically, the ratio I(4°)/I0 between the outgoing light intensity I(4°) at a position inclined at 4° in the film longitudinal direction from the normal direction of the light-transmitting substrate surface and I0 is preferably from 0.02 to 0.06, more preferably from 0.03 to 0.05, and most preferably from 0.035 to 0.045.

When the I(4°)/I0 value is 0.02 or more, generation of moiré can be more successfully prevented, and when the value is 0.06 or less, the reduction of front contrast can be more suppressed.

The internal haze (a value obtained by subtracting the surface haze value from the total haze value) of the light-transmitting substrate is preferably from 0.1 to 35%, more preferably from 1 to 25%, and most preferably from 2 to 15%. Within this range, thanks to appropriate internal scattering in addition to surface scattering by the surface unevenness, it can be made difficult to perceive the pattern, color unevenness, luminance unevenness and the like of a liquid crystal panel.

The surface haze value of the light-transmitting substrate is preferably from 3 to 40%, more preferably from 5 to 35%, and most preferably from 8 to 28%.

In the present invention, the haze can be measured as follows in accordance with JIS-K7136 by using, for example, a haze meter, NDH2000, manufactured by Nippon Denshoku Industries Co., Ltd.

[1] The total haze value (H) of the obtained light-transmitting substrate is measured in accordance with JIS-K7136.

[2] Several drops of immersion oil for microscope (Immersion Oil TYPE A, refractive index n=1.515, produced by Nikon Corp.) are added to the front and back surfaces of the light-transmitting substrate, the substrate is sandwiched from front and back by two 1 mm-thick glass plates (Microslide Glass No. S9111, produced by MATSUNAMI K.K.), two glass plates are put into complete contact with the obtained light-transmitting substrate to create a surface haze-removed state, and the haze is measured. From this value, the haze separately measured by interposing only silicone oil between two glass plates is subtracted, and the value obtained is calculated as the internal haze (Hin).

[3] The internal haze (Hin) calculated in [2] above is subtracted from the total haze (H) measured in [1] above, and the value obtained is calculated as the surface haze (Hout).

The transmitted image clarity of the light-transmitting substrate measured using an optical comb having a slit width of 2.0 mm is preferably from 10 to 65%, more preferably from 15 to 60%, and most preferably from 15 to 55%. Within this range, the reduction of front contrast can be lessened and at the same time, the pattern, color unevenness, luminance unevenness, moiré and the like of a liquid crystal panel can be made difficult to perceive.

Incidentally, the transmitted image clarity (%) can be measured in accordance with JIS K7105 (1999). As to the measurement apparatus, for example, ICM-1T manufactured by Suga Test Instruments Co., Ltd. can be used.

In the present invention, the configuration of surface B of the light-transmitting substrate is not particularly limited, but from the standpoint of imparting adherence to the polarizing film at the production of a polarizing plate or reducing the effect on light scattering property based on the above-described surface uneven profile of the present invention, another surface is preferably a smooth surface. The arithmetic mean roughness (Ra) of surface B is preferably from 0.001 to 0.10 µm, more preferably from 0.001 to 0.05 µm, and most preferably from 0.001 to 0.03 µm.

<Flat Translucent Particle>

The specific surface profile of the present invention can be achieved by incorporating a flat translucent particle into the light-transmitting substrate. In the present invention, specific examples of the shape of the flat particle include rugby-ball, discotic, bowl-like and high-prismatic shapes.

In the present invention, the shape of the flat translucent particle is expressed using mutually crossing three axis (axis x, axis y, axis z). That is, by applying mutually crossing three axis to the flat particle, the longest direction is assigned with axis x, the shortest direction is assigned with axis z, and the length is measured along the axis. In the present invention, the ratio [long axis length/short axis length] is defined as the aspect ratio of the flat particle (here, the long axis length is the length along the axis x of the flat particle, and the short axis length is the length along the axis z of the flat particle).

In the first preferable aspect of the present invention, in order to control the surface profile of the light-transmitting substrate, the flat particle must satisfy the following conditions:

$$0.40 \leq L/d \leq 1.90 \tag{f}$$

wherein

L: the thickness of the flat particle-containing region in the light-transmitting substrate, and d: the long axis length of the flat particle.

The thickness of the flat particle-containing region in the light-transmitting substrate can be determined as follows. A slice of the light-transmitting substrate is observed by an electron microscope, and the uppermost part on a flat particle in the substrate thickness direction in a region where a flat particle is present is taken as the top end of the flat particle-containing region of a flat particle. Also, the lowermost part on a flat particle in the substrate thickness direction in a region where a flat particle is present is taken as the bottom end of the flat particle-containing region. In the present invention, the thickness in the depth direction between the top end and the bottom end is determined and used as the thickness of the flat particle-containing region. The measurement is performed in viewing field containing 20 flat particles, and the average of three viewing fields is figured and defined as the thickness of the flat particle-containing region in the light-transmitting substrate.

The present inventors have made studies to control the light scattering property by incorporating a particle into a light-transmitting substrate composed of a thermoplastic resin and thereby forming unevenness in the substrate surface, as a result, it has been found that there is a large difference between the case of incorporating a translucent particle into a thermoplastic resin to form surface unevenness and the case of incorporating a translucent particle into a curable monomer to form surface unevenness. That is, in the case of incorporating a translucent particle into a curable monomer, the curable monomer flows during film formation and exerts a high ability of leveling and smoothing the surface, and the surface unevenness of the light-transmitting substrate formed is liable to have a profile where the shape of the translucent particle is gently leveled. On the other hand, in the case of incorporating a translucent particle into a thermoplastic resin, the thermoplastic resin rapidly enters a low flowable state during film formation and is likely to give a surface profile reflecting directly the shape of the translucent particle. The first preferable aspect of the present invention is a light-transmitting substrate composed of a thermoplastic resin, where light scattering property is controlled by setting the thickness of the flat particle-containing region and the flat shape to specific conditions and thereby forming a surface unevenness that is not a semispherical protrusion but is close to an elliptic shape with gentle curvature. This is not easily anticipated from conventional techniques.

The second preferable aspect of the present invention is a light-transmitting substrate composed of a thermoplastic resin, where a specific crosslinkable particle is used and the light scattering property is controlled by deforming the crosslinkable particle into a flat shape at the production of the substrate and thereby causing the light-transmitting substrate to have a surface unevenness that is not a semispherical protrusion but is close to an elliptic shape with gentle curvature. This is not easily anticipated from conventional techniques.

[Flat Translucent Particle in First Preferable Aspect of the Present Invention]

In the first preferable aspect of the present invention, the L/d value is from 0.40 to 1.90, preferably from 0.50 to 1.90, more preferably from 0.70 to 1.80, still more preferably from 0.80 to 1.80. If the L/d value is less than 0.40, the light-transmitting substrate comes to have an excessively smooth surface and the required light scattering property can be hardly obtained, whereas if the L/d value exceeds 1.90, the surface unevenness of the light-transmitting substrate may become too much severe or closely-spaced flat particles may cause brittle degradation of the substrate or decrease of adhesion strength.

The flat translucent particle preferably has a number average aspect ratio of 1.2 to 50, more preferably from 1.2 to 30, still more preferably from 1.3 to 10, and most preferably from 2 to 5.

Also, the long axis length is preferably from 1.5 to 50 µm, more preferably from 3.5 to 30 µm, still more preferably from 5.0 to 30 µm, and most preferably from 5.0 to 10 µm.

The refractive index of the flat particle is preferably from 1.40 to 1.65, more preferably from 1.45 to 1.60, and most preferably from 1.45 to 1.53. The difference from the refractive index of the substrate itself is preferably from 0.00 to 0.15, more preferably from 0.00 to 0.10, and most preferably from 0.005 to 0.05. If the refractive index difference from the substrate itself is excessively large, the internal scattering property becomes too strong and this is liable to incur increase of the haze and decrease of the front contrast.

The amount used of the flat particle in the first preferable aspect of the present invention is, per unit area, preferably from 0.1 to 5.0 g/m$^2$, more preferably from 0.2 to 3.0 g/m$^2$, and most preferably from 0.3 to 2.0 g/m$^2$. With the amount used in this range, the desired surface profile can be obtained.

The flat translucent particle may be an organic material, an inorganic material or an organic-inorganic composite material. Examples of the inorganic particle which can be used in the present invention include silicon oxide, titanium oxide, aluminum oxide, tin oxide, indium oxide, ITO, zinc oxide, zirconium oxide, antimony oxide, magnesium oxide, calcium carbonate, talc, clay, calcined kaolin, calcined calcium silicate, hydrous calcium silicate, aluminum silicate, magnesium silicate, calcium phosphate, and a composite oxide thereof. Examples of the organic particle include a polymethacrylic acid methyl acrylate resin powder, an acryl styrene-based resin powder, a polymethyl methacrylate resin powder, a silicon-based resin powder, a polystyrene-based resin powder, a polycarbonate resin powder, a benzoguanamine-based resin powder, a melamine-based resin powder, a polyolefin-based resin powder, a polyester-based resin powder, a polyamide-based resin powder, a polyimide-based resin powder and a polyfluorinated ethylene-based resin powder.

As for the commercially available product, examples of the inorganic flat translucent particle include an alumina particle such as "SERATH" produced by Kinsei Matec Co., Ltd., and a mica particle such as "MICROMICA" produced by CORP-CHEMICAL K.K. Examples of the flat translucent particle as an organic polymer include a flat polyethylene particle produced by Sumitomo Seika Chemicals Co., Ltd., a discotic particle produced by Smart Spheres Workshop Co., Ltd., and a silk protein particle produced by Idemitsu Petro-Chemical Co., Ltd. Also, two or more kinds of flat translucent particles may be used in combination.

Out of flat particles, a discotic particle is particularly preferred. As described, for example, in JP-A-2000-38455, the discotic particle can be prepared by a method where a monomer capable of forming an acrylic resin having a solubility parameter ($\delta_2$) with a difference ($\delta_1$-$\delta_2$) of 0.1 to 6.5 from the solubility parameter ($\delta_1$) of the resin forming a seed particle is dispersed in a reaction medium having dispersed therein the seed particle, in an amount of 120 to 2,500 parts by weight per 100 parts by weight of the seed particle, and seed polymerization is performed.

In order to achieve the surface uneven profile of the light-transmitting substrate of the present invention, the absolute value of the angle between the long axis (axis x) of the flat particle and the planar direction of the light-transmitting substrate is preferably not shifted from 0°. The absolute value of the shift angle is, on average, preferably 30° or less, more preferably 20° or less, and most preferably 10° or less. In the present invention, the method for aligning flat translucent particles in the planar direction of the light-transmitting substrate as described above includes, as a first embodiment, a production method where a thermoplastic resin and a flat translucent particle are mixed and dispersed, the mixture dispersion is melt-extruded, and the extruded film is stretched to produce a light-transmitting substrate; and, as a second embodiment, a production method where a dope containing a thermoplastic resin, a flat translucent particle and a solvent is cast on a base material, the cast film is separated, and the solvent is removed by drying to produce a light-transmitting substrate. These methods both are a production method of decreasing the thickness in the film thickness direction with respect to the initial state, whereby long axes of flat translucent particles can be aligned in the planar direction of the light-transmitting substrate. Details of these production methods are described later.

Also, as long as the surface unevenness range of the light-transmitting substrate of the present invention is satisfied, a particle that is not flat can be used in combination. By the use of this particle, scattering in the interior of the light-transmitting substrate can be finely controlled. The particle diameter of such a particle is preferably from 0.3 to 20 μm, more preferably from 1.5 tot 15 μm, and most preferably from 3.0 to 10 μm. The shape of the particle is not particularly limited, but a spherical particle is easily available and preferred. The refractive index is preferably from 1.40 to 1.65, more preferably from 1.45 to 1.60, and most preferably from 1.45 to 1.53. The difference from the refractive index of the substrate itself is preferably from 0.01 to 0.15, more preferably from 0.01 to 0.10, and most preferably from 0.02 to 0.05. The particle that is not flat may be used together with the flat particle, but co-casting using the particle as a separate dope is also preferred, and addition to a dope not forming the uppermost part on the surface A side is preferred because of little effect on the surface configuration.

[Flat Translucent Particle in Second Preferable Aspect of the Present Invention]

The flat translucent particle (sometimes referred to as a "flat particle" or a "flattened particle") contained in the light-transmitting substrate of the second preferable aspect of the present invention preferably has a number average aspect ratio of 1.2 to 50, more preferably from 1.3 to 30, still more preferably from 1.5 to 10, and most preferably from 1.5 to 2.5. Also, the long axis length is preferably from 1.5 to 50 μm, more preferably from 3.5 to 30 μm, and most preferably from 5.0 to 30 μm.

The translucent particle can be deformed to have almost no shape anisotropy in the in-plane direction (the length along axis x and the length along axis y are nearly equivalent) so as to equalize light diffusion in the light-transmitting substrate plane. Conversely, the translucent particle can be deformed to have shape anisotropy so as to impart anisotropy to the light diffusion of the light-transmitting substrate.

The refractive index of the flat particle in the second preferable aspect of the present invention is preferably from 1.40 to 1.65, more preferably from 1.45 to 1.60, and most preferably from 1.45 to 1.56. The difference from the refractive index of the substrate itself is preferably from 0.00 to 0.15, more preferably from 0.00 to 0.10, and most preferably from 0.005 to 0.05. If the refractive index difference from the substrate itself is excessively large, the internal scattering property becomes too strong and this is liable to incur increase of the haze and decrease of the front contrast. Also, the shape of the flat particle can be regarded as a kind of convex lens, and for preventing reduction of the front white luminance by utilizing this shape, the refractive index difference between the substrate itself and the flat particle is preferably from 0.01 to 0.15, more preferably from 0.02 to 0.13.

The amount used of the flat particle in the second preferable aspect of the present invention is, per unit area, preferably from 0.1 to 5.0 g/m², more preferably from 0.2 to 3.0 g/m², and most preferably from 0.3 to 2.0 g/m². With the amount used in this range, the desired surface profile can be obtained.

In the second preferable aspect of the present invention, in order to deform the crosslinkable particle into a flat shape in the substrate during film formation, it is preferred that the crosslinkable particle is a crosslinkable particle composed of a copolymer of a monofunctional monomer and a crosslinkable monomer and the crosslinking ratio of the particle is preferably lower within the range where the particle can keep solubility resistance. Conventionally, in forming a light-scattering film by coating a composition comprising an ionizing radiation-curable resin having dispersed therein a resin particle together with a solvent, a resin particle having a high crosslinking degree and less swelling with a solvent has been used as a particle suitable for the control of light diffusing property. However, in the present invention, a particle needs to be formed into a flat shape during film formation and a light-transmitting substrate is formed using a low-crosslinking resin particle that has been conventionally not used, whereby for the first time, an ideal surface profile of the light-scattering film can be imparted.

The crosslinking ratio of the particle according to the second preferable aspect of the present invention can be indicated by the content of a crosslinkable monomer based on all monomers participating in the particle formation. The content of the crosslinkable monomer is preferably from 1 to 25 mass %, more preferably from 2 to 20 mass %, still more preferably from 3 to 10 mass %. Within this range, solvent resistance and appropriate deformability at the film formation can be imparted. Also, the difference in thermal expansion coefficient between the crosslinkable particle and the thermoplastic resin surrounding the crosslinkable particle in the light-transmitting substrate can be decreased, and when the flat particle-containing light-transmitting substrate is used on the backlight side, the durability can be enhanced.

In the second preferable aspect of the present invention, the translucent particle preferably swells with a solvent. The swelling ratio is determined from the particle diameter (r1) measured within 3 hours after the completion of dispersion when the translucent particle is dispersed in a concentration of 30 mass % in toluene and the particle diameter (r2) when with aging of the liquid dispersion above in a static state at a room temperature (25° C.), the increase in particle diameter stops and an equilibrium state is reached, according to the following formula:

$$\text{Swelling ratio (vol \%)} = \{(r2/r1)^3 - 1\} \times 100$$

The swelling ratio is preferably from 20 to 100 vol %, more preferably from 25 to 80 vol %, still more preferably from 25 to 70 vol %. With the swelling ratio in the range above, deformation into a flat shape at the film formation of the light-transmitting substrate is facilitated, and dissolution or breakage of the particle itself does not occur during film formation.

The gel fraction of the translucent particle according to the second preferable aspect of the present invention is preferably from 40 to 90 mass % for imparting appropriate deformability at the film formation. The gel fraction is determined by the following method.

The particle powder is formed into a toluene liquid dispersion of 5 mass, the liquid dispersion is stirred at 25° C. for 48 hours, the particle is separated by a filtration method, the solution after filtration is desiccated, the mass of the residue is determined, and from this value, the ratio of the solid content remaining without dissolving into the toluene based on the original mass is calculated.

Examples of the polymerizable monofunctional monomer (hereinafter, sometimes simply referred to as a "polymerizable monomer") that is a constituent component of the particle according to the second preferable aspect of the present invention include an aromatic monovinyl compound such as styrene, ethyl vinyl benzene, α-methylstyrene, fluorostyrene and vinylpyridine; a vinyl cyanide compound such as acrylonitrile and methacrylonitrile; an acrylic acid ester monomer such as methyl acrylate, ethyl acrylate, isopropyl acrylate, tertiary butyl acrylate, butyl acrylate, 2-ethylhexylethyl acrylate, cyclohexyl acrylate, phenyl acrylate, benzyl acrylate, glycidyl acrylate, N,N'-dimethylaminoethyl acrylate and hydroxyethyl acrylate; a methacrylic acid ester monomer such as methyl methacrylate, ethyl methacrylate, isopropyl methacrylate, tertiary butyl methacrylate, butyl methacrylate, 2-ethylhexylethyl methacrylate, cyclohexyl methacrylate, phenyl methacrylate, benzyl methacrylate, glycidyl methacrylate, N,N'-dimethylamino methacrylate and hydroxyethyl methacrylate; a mono- or di-carboxylic acid and an acid hydride of dicarboxylic acid, such as acrylic acid, methacrylic acid, maleic acid and itaconic acid; an amide-based monomer such as acrylamide, methylacrylamide, ethylacrylamide, tertiary butylacrylamide, methacrylamide, methylmethacrylamide, ethylmethacrylamide and tertiary butylmethacrylamide; vinyl acetate; hydroxyethyl vinyl ether; and hydroxybutyl vinyl ether. Of these polymerizable monomers, an aromatic monovinyl compound, an acrylic acid ester monomer and a methacrylic acid ester monomer are preferred, and styrene, methyl methacrylate and ethyl methacrylate are more preferred. Also, two or more kinds of polymerizable monomers can be used in combination.

In the present invention, for enhancing the resistance of the flat particle containing light-transmitting substrate to a change in the temperature or humidity, the crosslinkable flat particle is preferably close in the saturated water content to the thermoplastic rein surrounding the particle. In the case of using a cellulose acylate-based resin for the thermoplastic resin, a functional group or hydrophilic group having high polarity is preferably introduced into the crosslinkable particle, and examples of the polymerizable monomer component which can be used include hydroxyethyl acrylate, hydroxyethyl methacrylate, glycidyl acrylate, glycidyl acrylate, acrylic acid, methacrylic acid, ethylacrylamide and tertiary butylacrylamide. Such a monomer is preferably used to occupy from 0.1 to 20 mass %, more preferably from 1 to 15 mass %, in the copolymer forming the crosslinkable particle.

In the second preferable aspect of the present invention, for making it easy to form a flat particle during the formation of the light-transmitting substrate, the crosslinkable particle preferably has plasticity close to that of the thermoplastic resin. In order to facilitate the deformation of the crosslinkable particle, it is preferred to use at least one kind of a monomer having, when the polymerizable monomer is polymerized as a single polymer having a molecular weight of 100,000 or more, a glass transition temperature of −80 to 100° C., more preferably from −60 to 80° C., and most preferably from −20 to 60° C. For controlling the plasticity of the crosslinkable particle, use of a mixture of a polymerizable monomer and other monomers differing in the above-described glass transition temperature is also preferred. The polymerizable monomer having the above-described glass transition temperature is preferably used in a proportion of 5 to 99 mass, more preferably from 20 to 80 mass, in the crosslinkable particle.

In the second preferable aspect of the present invention, the crosslinkable particle contains a polymerizable monomer having a glass transition temperature in the range above, whereby the difference in the thermal expansion coefficient from the thermoplastic resin surrounding the crosslinkable particle can be decreased and the durability in using the flat particle-containing light-transmitting substrate on the backlight side can be enhanced.

Specific examples of the crosslinkable monomer constituting the particle according to the second preferable aspect of the present invention include an aromatic monomer such as divinylbenzene, trivinylbenzene, divinyltoluene, divinylxylene, ethyldivinylbenzene, divinylnaphthalene, divinylalkylbenzenes, divinylphenanthrene, divinylbiphenyl, divinyldiphenylmethane, divinylbenzyl, divinylphenylether and divinyldiphenylsulfide; an oxygen-containing monomer such as divinylfuran; a sulfur-containing monomer such as divinylsulfide and divinylsulfone; an aliphatic monomer such as butadiene, isoprene and pentadiene; ethylene glycol di(meth)acrylate, diethylene glycol di(meth)acrylate, triethylene glycol di(meth)acrylate, polyethylene glycol di(meth)acrylate, 1,3-butanediol di(meth)acrylate, 1,4-butanediol di(meth)acrylate, 1,6-hexanediol di(meth)acrylate, octanediol di(meth)acrylate, decanediol di(meth)acrylate, trimethylolpropane di(meth)acrylate, trimethylolpropane tri(meth)acrylate, pentaerythritol di(meth)acrylate, pentaerythritol tri(meth)acrylate, pentaerythritol tetra(meth)acrylate, dipentaerythritol di(meth)acrylate, dipentaerythritol tri(meth)acrylate, dipentaerythritol tetra(meth)acrylate, N,N'-methylenebis(meth)acrylamide, triallyl isocyanurate, triallylamine, tetraallyloxyethane, and an ester compound of a polyhydric alcohol such as hydroquinone, catechol, resorcinol and sorbitol with an acrylic acid or a methacrylic acid. One of these monomers may be used alone, or two or more thereof may be used in combination.

Among these, preferred are ethylene glycol di(meth)acrylate, trimethylolpropane tri(meth)acrylate, pentaerythritol tri(meth)acrylate, pentaerythritol tetra(meth)acrylate, divinylbenzene, trivinylbenzene and divinylnaphthalene.

Specific preferred examples of the particle according to the second preferable aspect of the present invention include a resin particle such as crosslinked polymethyl methacrylate particle, crosslinked methyl methacrylate-styrene copolymer particle, crosslinked polystyrene particle, crosslinked methyl methacrylate-methyl acrylate copolymer particle and crosslinked acrylate-styrene copolymer particle. Among these, a crosslinked styrene particle, a crosslinked polymethyl methacrylate particle and a crosslinked methyl methacrylate-styrene copolymer particle are preferred.

The crosslinkable particle according to the second preferable aspect of the present invention may be produced by any method such as suspension polymerization, emulsion polymerization, soap-free emulsion polymerization, dispersion polymerization and seed polymerization. As for these production methods, there may be referred to the methods described, for example, in Takayuki Ohtsu and Masanobu Kinoshita, *Kobunshi Gousei no Jikken Hou (Experimental Method of Polymer Synthesis)*, pages 130, 146 and 147, Kagaku-Dojin Publishing Co., Inc., *Gosei Kobunshi (Synthetic Polymer)*, 1, pp. 246-290, *ibid.*, 3, pp. 1-108, Japanese Patent Nos. 2,543,503, 3,508,304, 2,746,275, 3,521,560 and 3,580,320, JP-A-10-1561, JP-A-7-2908, JP-A-5-297506 and JP-A-2002-145919.

For example, the emulsion polymerization and suspension polymerization include a method of microparticulating and polymerizing a monomer in a water medium. Examples of the dispersion stabilizing surfactant include an anionic surfactant such as dodecylbenzenesulfonate, dodecylsulfate, laurylsulfate and dialkylsulfosuccinate; and a nonionic surfactant such as polyoxyethylene nonylphenyl ether and polyethylene glycol monostearate. Furthermore, examples of the dispersion stabilizer include polymers and oligomers, such as polyvinyl alcohol, sodium polyacrylate, a hydrolysate of styrene-maleic acid copolymer, sodium alginate, and water-soluble cellulose derivative. Also, in the method where an addition-polymerization reaction started by an oil-soluble polymerization initiator is performed using water as a dispersion medium in the presence of inorganic salts and/or a dispersion stabilizer, examples of the water-soluble salts which can be used include sodium chloride, potassium chloride, calcium chloride and magnesium sulfate. Examples of the polymerization initiator include an azobis compound (e.g., azobisisobutyronitrile, azobis[cyclohexane-1-carbonitrile]) and peroxides (e.g., benzoyl peroxide, tert-butyl peroxide).

A so-called multi-stage polymerization method where a fine polymer is previously prepared and then impregnated with a monomer to thicken the particle, is also preferred.

The shape of the crosslinkable particle may be either really spherical or amorphous, but in view of control of the diffusibility and homogeneity of the coated surface state, a really spherical monodisperse particle is preferred. For example, when a particle having a particle diameter 20% or more larger than the average particle diameter is designated as a coarse particle, the proportion of the coarse particle is preferably 1% or less, more preferably 0.1% or less, still more preferably 0.01% or less, of the total particle number. The particle having such a particle diameter distribution can be obtained by performing classification after a normal synthesis reaction, and when the number of classifications is increased or the level of classification is elevated, a particle having a more preferred distribution can be obtained.

In order to achieve the surface uneven profile of the light-transmitting substrate of the present invention, the absolute value of the angle between the long axis (axis x) of the flat particle and the planar direction of the light-transmitting substrate is preferably not shifted from 0°. The absolute value of the shift angle is, on average, preferably 30° or less, more preferably 20° or less, and most preferably 10° or less. In the present invention, the method for aligning flat translucent particles in the planar direction of the light-transmitting substrate includes, as a first embodiment, a production method where a thermoplastic resin and a flat translucent particle are mixed and dispersed, the mixture dispersion is melt-extruded, and the extruded film is stretched to produce a light-transmitting substrate containing a flat particle in the inside thereof; and, as a second embodiment, a production method where a dope prepared by dispersing a polymer (thermoplastic resin) and a crosslinkable particle in a solvent is cast on a support, the cast film is separated, and the solvent is removed by drying to produce a light-transmitting substrate containing a flat particle in the inside thereof. These methods both are a production method of decreasing the thickness in the film thickness direction with respect to the initial state, whereby long axes of flat translucent particles can be aligned in the planar direction of the light-transmitting substrate. Details of these production methods are described later.

Also, as long as the surface unevenness range of the light-transmitting substrate of the present invention is satisfied, a particle that is not deformed into a flat shape in the course of film formation can be used in combination. By the use of this particle, scattering in the interior of the light-transmitting substrate can be finely controlled. The particle diameter of such a particle is preferably from 0.3 to 20 μm, more preferably from 1.5 tot 15 μm, and most preferably from 3.0 to 10 μm. The shape of the particle is not particularly limited, but a spherical particle is easily available and preferred. The refractive index is preferably from 1.40 to 1.65, more preferably from 1.45 to 1.60, and most preferably from 1.45 to 1.53. The difference from the refractive index of the substrate itself is preferably from 0.01 to 0.15, more preferably from 0.01 to 0.10, and most preferably from 0.02 to 0.05. Specific examples of the particle that is not deformed into a flat shape in the course of film formation include a resin particle having a high crosslinkable monomer content and hardly swelling, and an inorganic oxide particle containing an oxide of an element such as silica, alumina, zirconia, titanium and tin. Such a particle may be used together with the flat particle, but co-casting using the particle as a separate dope is also preferred, and addition to a dope not forming the uppermost part on the surface A side is preferred because of little effect on the surface configuration.

<Material of Light-Transmitting Substrate>

The translucent light-transmitting substrate of the present invention is described below. Preferably, the main component (a material in a ratio of 51 to 99 mass %) constituting the light-transmitting substrate of the present invention is composed of a thermoplastic resin. Specific examples of the thermoplastic resin include cellulose acylate (e.g., triacetyl cellulose, diacetyl cellulose, propionyl cellulose, butyryl cellulose, acetylpropionyl cellulose, nitrocellulose), polyamide, polycarbonate, polyester (e.g., polyethylene terephthalate, polyethylene naphthalate, poly-1,4-cyclohexanedimethylene terephthalate, polyethylene-1,2-diphenoxyethane-4,4'-dicarboxylate, polybutylene terephthalate), polystyrene (e.g., syndiotactic polystyrene), polyolefin (e.g., polypropylene, polyethylene, polymethylpentene, polycycloalkane), polysulfone, polyethersulfone, polyallylate, polyetherimide, polymethyl methacrylate, polyether ketone, norbornene-based resin (ARTON, trade name, produced by JSR), amorphous polyolefin (ZEONEX, trade name, produced by Nippon Zeon Co., Ltd.), and (meth)acrylic resin (ACRYPET VRL20A, trade name, produced by Mitsubishi Rayon Co., Ltd., and ring structure-containing acrylic resins described in JP-A-2004-70296 and JP-A-2006-171464)). Above all, tri-acetyl cellulose, diacetyl cellulose, propionyl cellulose, polyethylene terephthalate and polyethylene naphthalate are preferred.

In the case of using the light-transmitting substrate of the present invention for a polarizing plate, the balance of hydrophobicity/hydrophilicity of the film, the lamination property to a vinyl alcohol-based film of the polarizing film, and the uniformity of optical properties in the entire film plane are important, and a cellulose acylate film is particularly preferred.

The cellulose acylate is preferably a carboxylic acid ester having a total carbon number of 2 to 22 of cellulose. Examples thereof include an alkylcarbonyl ester of cellulose, an alkenylcarbonyl ester of cellulose, a cycloalkylcarbonyl ester of cellulose, an aromatic carbonyl ester of cellulose, and an aromatic alkylcarbonyl ester of cellulose, and these esters may further have a substituted group.

The acyl group having a carbon number of 2 to 22 in the cellulose acylate may be an aliphatic acyl group or an aromatic acyl group and is not particularly limited. Preferred examples of the acyl group include an acetyl group, a propionyl group, a butanoyl group, a heptanoyl group, a hexanoyl group, an octanoyl group, a cyclohexanecarbonyl group, an adamantanecarbonyl group, a phenylacetyl group, a benzoyl group, a naphthylcarbonyl group, a (meth)acryloyl group and a cinnamoyl group. Among these acyl groups, more preferred are acetyl, propionyl, butanoyl, pentanoyl, hexanoyl, cyclohexanecarbonyl, phenylacetyl, benzoyl and naphthylcarbonyl.

Above all, the cellulose acylate is preferably a fatty acid ester of cellulose, more preferably triacetyl cellulose, diacetyl cellulose or propionyl cellulose.

The cellulose acylate suitably used in the present invention is preferably a cellulose acylate where the substitution degrees to the hydroxyl group of cellulose satisfy the following mathematical formulae (7) and (8):

$$2.3 \leq SA' + SB' \leq 3.0 \quad \text{Mathematical Formula (7)}$$

$$0 \leq SA' \leq 3.0 \quad \text{Mathematical Formula (8)}$$

wherein SA' represents the substitution degree of the acetyl group substituted for the hydrogen atom of the hydroxyl group of cellulose, and SB' represents the substitution degree of the acyl group having a carbon number of 3 to 22 substituted for the hydrogen atom of the hydroxyl group of cellulose. Incidentally, SA represents an acetyl group substituted for the hydrogen atom of the hydroxyl group of cellulose, and SB represents an acyl group having a carbon number of 3 to 22 substituted for the hydrogen atom of the hydroxyl group of cellulose.

The β-1,4-bonded glucose unit constituting cellulose has a free hydroxyl group at the 2-position, 3-position and 6-position. The cellulose acylate is a resin where these hydroxyl groups are partially or entirely esterified with an acyl group. The acyl substitution degree means a ratio in which the hydroxyl group is esterified at each of the 2-position, 3-position and 6-position (100% esterification at each position corresponds to a substitution degree of 1). In the present invention, the sum total (SA'+SB') of the substitution degrees of SA and SB is preferably from 2.6 to 3.0, more preferably from 2.70 to 3.00. The substitution degree (SA') of SA is preferably from 1.4 to 3.0, more preferably from 2.3 to 2.9.

Also, in the present invention, the carbon number of the acyl group substituting for the hydrogen atom of the hydroxyl group of cellulose, which is SB above, is preferably 3 or 4. The substitution degree of substitution by an acyl group having such a carbon number preferably further satisfies, in addition to mathematical formulae (7) and (8) above, the following mathematical formula (9) at the same time.

$$0 \leq SB' \leq 1.2 \quad \text{Mathematical Formula (9)}$$

The substitution degree is obtained by calculation after measuring the bonding degree of a fatty acid bonded to the hydroxyl group in cellulose. As for the measuring method, the measurement can be performed in accordance with ASTM-D817-91 and ASTM-D817-96. Also, the substituted state of the acyl group on the hydroxyl group is measured by the $^{13}C$ NMR method.

The cellulose acylate film is preferably composed of a cellulose acylate in which the polymer components constituting the film substantially satisfy mathematical formulae (7) and (8). The "substantially" means 55 mass % or more (preferably 70 mass % or more, more preferably 80 mass % or more) of all polymer components. One cellulose acylate may be used alone, or two or more kinds of cellulose acylates may be used in combination.

The polymerization degree of the cellulose acylate is, in terms of the viscosity average polymerization degree, preferably from 200 to 700, more preferably from 230 to 550, still more preferably from 230 to 350, yet still more preferably from 240 to 320. The average polymerization degree can be measured by the limiting viscosity method of Uda, et al. (Kazuo Uda and Hideo Saito, *JOURNAL OF THE SOCIETY OF FIBER SCIENCE AND TECHNOLOGY, JAPAN*, Vol. 18, No. 1, pp. 105-120 (1962)). Furthermore, this is described in detail in JP-A-9-95538.

The number average molecular weight Mn of the cellulose acylate is preferably from $7 \times 10^4$ to $25 \times 10^4$, more preferably from $8 \times 10^4$ to $15 \times 10^4$. The ratio Mw/Mn to the mass average molecular weight Mw of the cellulose acylate is preferably from 1.0 to 5.0, more preferably from 1.0 to 3.0. The average molecular weight and molecular weight distribution of the cellulose acylate can be measured using a high-performance liquid chromatography. Using the results obtained, Mn and Mw can be calculated and then, Mw/Mn can be calculated.

In producing the light-transmitting substrate of the present invention, a method of casting and stacking layers, such as co-casting (simultaneous multilayer casting), sequential casting and coating, can be used. In the case of producing the substrate by a co-casting method or a sequential casting method, a plurality of dopes are first prepared. The co-casting method is a casting method where the plurality of dopes (three or more kinds of dopes) are simultaneously cast on a casting support (band or drum) by a casting geeser of simultaneously extruding dopes from separate slits or the like and the stack is separated from the support at an appropriate time and dried to form a light-transmitting substrate.

The sequential casting method is a casting method where a first dope for casting is extruded and cast on a casting support by a casting geeser, after drying or not drying it, a second dope for casing is extruded and cast thereon by the casting geeser, third and subsequent dopes are sequentially cast in the same manner, and the stack is separated from the support at an appropriate time and dried to form a light-transmitting substrate.

The coating method is in general a method where a film as a base layer is formed by a solution film-forming method, a coating solution for coating to form a surface layer is prepared, and the coating solution is coated on the base layer film one surface after another surface or simultaneously on both surfaces by using an appropriate coater and dried to form a substrate.

In the preparation of the solution (dope) of the material (e.g., thermoplastic resin, translucent particle) forming the light-transmitting substrate, the dissolution method is not particularly limited, and the dissolution is performed by a room-temperature dissolution method, a cooling dissolution method or a high-temperature dissolution method. Details of these methods are described, for example, in JP-A-5-163301, JP-A-61-106628, JP-A-58-127737, JP-A-9-95544, JP-A-10-95854, JP-A-10-45950, JP-A-2000-53784, JP-A-11-322946, JP-A-11-322947, JP-A-2-276830, JP-A-2000-273239, JP-A-11-71463, JP-A-04-259511, JP-A-2000-273184, JP-A-11-323017 and JP-A-11-302388. In particular, dissolution in a non-chlorine type solvent system is performed by the method described in detail in *JIII Journal of Technical Disclosure*, No. 2001-1745 pp. 22-25. Furthermore, the dope solution of cellulose acylate is usually further subjected to solution concentration and filtration, and these are described in detail similarly in *JIII Journal of Technical Disclosure*, No. 2001-1745 supra, page 25. Incidentally, in the case of dissolving the material at a high temperature, the temperature is in most cases not lower than the boiling point of the organic solvent used and at this time, the system is used in a pressurized state.

(Solvent)

The organic solvent in which the material (thermoplastic resin) forming the light-transmitting substrate is dissolved, is described below. The organic solvent used includes conventionally known organic solvents and, for example, a solvent having a dissolution parameter of 17 to 22 is preferred. The dissolution parameter indicates a dissolution parameter described, for example, in J. Brandrup, E. H., et al., *Polymer*

Handbook, 4th ed., VII/671 to VII/714. Examples of this solvent include a chloride of lower aliphatic hydrocarbon, a lower aliphatic alcohol, a ketone having a carbon number of 3 to 12, an ester having a carbon number of 3 to 12, an ether having a carbon number of 3 to 12, aliphatic hydrocarbons having a carbon number of 5 to 8, aromatic hydrocarbons having a carbon number of 6 to 12, and fluoroalcohols (for example, compounds described in JP-A-8-143709, paragraph [0020] and JP-A-11-60807, paragraph [0037]).

The material forming the light-transmitting substrate is preferably dissolved in an organic solvent in a concentration of 10 to 30 mass %, more preferably from 13 to 27 mass %, still more preferably from 15 to 25 mass %. As for the method of preparing the solution in such a concentration, the solution may be prepared in a predetermined concentration in the dissolving step, or the solution may be previously prepared as a low-concentration solution (for example, from 9 to 14 mass %) and then formed into a predetermined high-concentration solution in the later-described concentration step. Also, a high-concentration solution of the material forming the light-transmitting substrate may be previously prepared and thereafter, various additives may be added thereto to obtain a solution having a predetermined low concentration.

In the first preferable aspect of the present invention, shrinkage occurs in the substrate thickness direction in the course of drying the flat particle-containing dope, whereby long axes of flat translucent particles can be aligned in the planar direction of the light-transmitting substrate. Thanks to this alignment, a desired surface profile can be obtained with ease.

In the second preferable aspect of the present invention, shrinkage occurs in the substrate thickness direction in the course of drying the crosslinkable particle-containing dope, and a compressive force acts on the crosslinkable particle, whereby the particle can be deformed into a flat shape. Thanks to this deformation, a desired surface profile can be obtained with ease.

As for the solvent used in the present invention, one solvent may be used alone, or some solvents may be used in combination, but a good solvent and a poor solvent are preferably mixed and used from the standpoint of imparting surface stability. More preferably, the mixing ratio of a good solvent and a poor solvent is from 65 to 95 mass % of a good solvent and from 35 to 5 mass % of a poor solvent. In the present invention, a good solvent indicates a solvent capable of independently dissolving the resin used, and a poor solvent indicates a solvent incapable of independently swelling or dissolving the resin used. The good solvent for use in the present invention includes an organic halogen compound such as methylene chloride, and dioxolanes. Preferred examples of the poor solvent for use in the present invention include methanol, ethanol, n-butanol and cyclohexane.

In another embodiment of the present invention, the light-transmitting substrate may also be formed by a melt-extrusion film-forming method. That is, the above-described thermoplastic resin and flat particle are mixed and dissolved, the solution is formed by melt extrusion, and the extruded film is stretched to produce a light-transmitting substrate. In the present invention, the film is preferably stretched by biaxial stretching at a stretch ratio of 1.0 to 2.0 times in a fixed direction and a stretch ratio of 1.5 to 7.0 times in the direction orthogonal to the fixed direction. More preferably, the stretch ratio in the longitudinal direction is from 1.1 to 1.8 times, and the stretch ratio in the transverse direction is from 3.0 to 5.0 times. With the stretch ratio in this range, flat particles can be made to easily align on the plane of the light-transmitting substrate.

(Stretching Treatment)

In the light-transmitting substrate of the second preferable aspect of the present invention, the shape of the flat particle formed inside of the substrate can be controlled by a stretching treatment. Stretching of the substrate film is preferably performed under heating condition. In order to greatly deform the particle, the substrate film needs to be stretched at a high stretch ratio. For this purpose, the film surface temperature during stretching is preferably set to be higher than the apparent glass transition temperature Tg of the substrate film at the stretching. In the case of cellulose acylate film, the film is preferably stretched at 130 to 180° C., more preferably at 140 to 180° C., still more preferably at 150 to 180° C.

For stretching the film at a high stretch ratio, the residual solvent amount of the substrate film during stretching may be increased, in place of raising the film surface temperature at the stretching. The residual solvent amount during stretching is specifically defined by a residual solvent amount at the time of peeling the web from the support (before biaxial stretching) or a residual solvent amount at the completion of stretching. The residual solvent amount at the peeling is preferably from 50 to 100 mass %, more preferably from 70 to 100 mass %, and most preferably from 80 to 100 mass %. The residual solvent amount at the completion of stretching is preferably from 15 to 30 mass %, more preferably from 20 to 30 mass %. The residual solvent amount is defined by (A−B)/B×100%, wherein A is the mass of the web, and B is the mass after drying the web at 140° C. for 60 minutes.

In the solution film formation, stretching of the substrate film can be performed by simultaneous or sequential biaxial stretching. In order to greatly deform the particle, the film needs to be stretched at a high stretch ratio, and the longitudinal stretching may be performed by stretching at a draw ratio of 0.1 to 100% and is preferably stretching at a draw ratio of 10 to 80%, more preferably from 20 to 60%. The transverse stretching may be performed by stretching at a draw ratio of 3 to 100% and is preferably stretching at a draw ratio of 5 to 100%, more preferably from 20 to 80%.

Optical anisotropy sometimes develops during stretching of the substrate film, but this can be coped with by a design including other members. Also, for decreasing the optical anisotropy, the stretching rate may be decreased to reduce the orientation of the thermoplastic resin in the substrate. Furthermore, an optical anisotropy adjusting agent for canceling the optical anisotropy generated due to stretching may be added, or a thermoplastic resin hardly allowing generation of anisotropy may be selected.

In order to enhance the durability of the flat particle-containing light-transmitting substrate, a relaxing step may be provided after stretching. In the relaxing step, the width of the film after relaxing is preferably adjusted to 100 to 70% (relaxing ratio: from 0 to 30%) based on the width of the film before relaxing. The temperature in the relaxing step is preferably from (apparent glass transition temperature Tg of film−10) to (Tg+20° C.)

Here, as for the apparent Tg of the film in the stretching step, the film containing a residual solvent is sealed in an aluminum pan, the temperature is raised from 25° C. to 150° C. at 20° C./min by a differential scanning calorimeter (DSC), and an endothermic curve is figured, whereby Tg is determined.

In producing the light-transmitting substrate in the present invention, any of a co-casting method, a sequential casting method, a coating method and a melt-extrusion film-forming method may be used. However, in general, the coating method requires a large drying load after coating, and the sequential casting method involves a complicated process and hardly allows the film to maintain its planarity, whereas in the co-casting method, the process is simple and the productivity is high. Therefore, the substrate is preferably produced by the co-casting method. In the melt film formation, the film is formed by dissolving raw materials without using a solvent and therefore, depending on the substrate, a foreign matter trouble due to partial dissolution failure may be caused.

In the light-transmitting substrate, regions differing in the particle abundance in the substrate depth direction are preferably formed. The region having a large particle abundance is preferably present on the surface A side of the light-transmitting substrate, and the particle is preferably present, in terms of the depth in the substrate thickness direction from the surface on the surface A side, to a depth of 90% from the surface A-side surface, more preferably to a depth of 75% from the surface A-side surface, and most preferably to a depth of 50% from the surface A-side surface. Also, the particle may not be contained in the region to a depth of 5% from the surface A-side surface. When the flat particle is allowed to present in the range above, the surface configuration of the present invention can be obtained. In order to unevenly distribute particles in the specific depth direction, the light-transmitting substrate can be formed by simultaneously or sequentially casting a plurality of dopes differing in the particle content or by co-extruding a plurality of dissolved resins differing in the particle content.

In the first preferable aspect of the present invention, the flat particle content in the dope containing a flat particle is preferably from 0.4 to 50 mass %, more preferably from 2 to 40 mass %, still more preferably from 8 to 30 mass %.

The thickness of the light-transmitting substrate of the present invention is preferably from 20 to 200 μm, more preferably from 20 to 80 μm and most preferably from 25 to 50 μm. In the case of forming a light-transmitting substrate by co-casting using a plurality of dopes, the thickness ratio of the surface layer dope (when surface layer is present on both surfaces, the total thickness) to the base layer dope is preferably from 0.25 to 50%, more preferably from 0.6 to 40%. If the thickness ratio, of the surface layer dope is less than 0.25%, a uniform layer is difficult to form, whereas if the thickness ratio of the surface layer dope exceeds 50%, the dope may not be stabilized at the interface to impair the surface state. Here, the thickness of the dope means a thickness after the solvent is volatilized. Also, the terms "surface layer dope" and "base layer dope" as used herein indicate a state where thermoplastic resins each in a dope state of being dissolved in a solvent are forming a surface layer and a base layer adjacent to each other through a casting die, and does not indicate that an interface is present in the light-transmitting substrate after the solvent is evaporated.

In the light-transmitting substrate, the following additives may be added.

(Plasticizer)

In the light-transmitting substrate, a plasticizer can be added. By virtue of adding a plasticizer, flexibility can be imparted to the light-transmitting substrate, and the dimensional stability and moisture resistance can be enhanced.

In the case of using a cellulose acylate as the material of the substrate, a plasticizer having an octanol/water partition coefficient (logP value) of 0 to 10 is preferably used in particular. Use of plasticizer in this range is preferred, because when the logP value of the compound is 10 or less, compatibility with cellulose acylate is good and the film is free from troubles such as white turbidity or powdery bloom, and when the logP value is 0 or more, hydrophilicity is kept from becoming excessively high and a problem such as worsening of water resistance of the cellulose acylate film is hardly caused. The logP value is more preferably from 1 to 8, still more preferably from 2 to 7.

The octanol/water partition coefficient (logP value) can be measured by a shake flask method described in Japanese Industrial Standards (JIS) Z7260-107 (2000). In place of actual measurement, the octanol/water partition coefficient (logP value) can also be estimated by a chemical computational method or an empirical method. Preferred examples of the computational method include the Crippen's fragmentation method [see, *J. Chem. Inf. Comput. Sci.*, Vol. 27, page 21 (1987)], the Viswanadhan's fragmentation method [see, *J. Chem. Inf. Comput. Sci.*, Vol. 29, page 163 (1989)], and the Broto's fragmentation method [see, *Eur. J. Med. Chem.-Chim. Theor.*, Vol. 19, page 71 (1984)]. Above all, the Crippen's fragmentation method is more preferred. In the case where the logP value of a certain compound varies depending on the measuring method or calculating method, whether the compound is within the range of the present invention or not is preferably judged by the Crippen's fragmentation method.

The plasticizer which is preferably added includes low molecular to oligomer compounds having a molecular weight of 190 to 5,000 that is within the range above of physical properties and, for example, a phosphoric acid ester, a carboxylic acid ester or a polyol ester is used.

Examples of the phosphoric acid ester include triphenyl phosphate (TPP), tricresyl phosphate, cresyl diphenyl phosphate, octyl diphenyl phosphate, diphenylbiphenyl phosphate, trioctyl phosphate and tributyl phosphate.

Representative examples of the carboxylic acid ester include a phthalic acid ester and a citric acid ester. Examples of the phthalic acid ester include dimethyl phthalate, diethyl phthalate, dibutyl phthalate, dioctyl phthalate, diphenyl phthalate and diethyl hexyl phthalate. Examples of the citric acid ester include O-acetyl triethyl citrate, O-acetyl tributyl citrate, acetyl triethyl citrate, and acetyl tributyl citrate.

These preferred plasticizers are a liquid at 25° C. except for TPP (melting point: about 50° C.), and their boiling point is also 250° C. or more.

Other examples of the carboxylic acid ester include butyl oleate, methyl acetyl ricinoleate, dibutyl sebacate and various trimellitic acid esters. Examples of the glycolic acid ester include triacetin, tributyrin, butyl phthalyl butyl glycolate, ethyl phthalyl ethyl glycolate, methyl phthalyl ethyl glycolate, butyl phthalyl butyl glycolate, methyl phthalyl methyl glycolate, propyl phthalyl propyl glycolate, butyl phthalyl butyl glycolate, and octyl phthalyl octyl glycolate.

In addition, plasticizers described, for example, in JP-A-5-194788, JP-A-60-250053, JP-A-4-227941, JP-A-6-16869, JP-A-5-271471, JP-A-7-286068, JP-A-5-5047, JP-A-11-80381, JP-A-7-20317, JP-A-8-57879, JP-A-10-152568 and JP-A-10-120824 may also be preferably used. In these patent publications, not only examples of the plasticizer but also many preferred embodiments of their utilization methods or properties are described, and these may be preferably employed also in the present invention.

Other preferred examples of the plasticizer include (di) pentaerythritol esters described in. JP-A-11-124445, glycerol esters described in JP-A-11-246704, diglycerol esters described in JP-A-2000-63560, citric acid esters described in JP-A-11-92574, substituted phenylphosphoric acid esters described in JP-A-11-90946, and ester compounds containing an aromatic ring and a cyclohexane ring described in JP-A-2003-165868.

A polymer plasticizer containing a resin component having a molecular weight of 1,000 to 100,000 is also preferably used. Examples thereof include polyesters and/or polyethers described in JP-A-2002-22956, polyester ethers, polyester urethanes and polyesters described in JP-A-5-197073, copolyester ethers described in JP-A-2-292342, and epoxy resins and novolak resins described in J-PA-2002-146044.

One of these plasticizers may be used alone, or two or more kinds thereof may be mixed and used. The amount of the plasticizer added is preferably from 2 to 30 parts by mass, more preferably from 5 to 20 parts by mass, per 100 parts by mass of the cellulose acylate. Also, in the dope containing a flat translucent particle, the plasticizer content is preferably high so as to enhance the affinity of cellulose acylate for the translucent particle or improve the brittleness.

In the production method of the second preferable aspect of the present invention, the plasticizer described above is preferably dispersed and aged together with the crosslinkable particle (swellable particle) in a solvent to facilitate deformation of the swellable particle at the film formation. In a state of being dispersed together with a solvent and a plasticizer, the inside of the crosslinking particle is readily impregnated with the plasticizer and this makes it easy for the crosslinkable particle to deform at the film formation of the light-transmitting substrate. As for the plasticizer, plasticizers described above with respect to the light-transmitting substrate may be used, but a phosphoric acid ester or carboxylic acid ester having a molecular weight of 1,500 or less is preferred.

(Ultraviolet Inhibitor)

In the light-transmitting substrate, an ultraviolet inhibitor (ultraviolet absorber) is preferably further added so as to enhance the light fastness of the film itself or prevent deterioration of a polarizing plate or an image display member such as liquid crystal compound of a liquid crystal display device.

The ultraviolet absorber preferably has excellent ability of absorbing an ultraviolet ray at a wavelength of 370 nm or less from the standpoint of preventing deterioration of the liquid crystal and preferably exhibits as little absorption as possible for visible light at a wavelength of 400 nm or more in view of good image display property. In particular, the transmittance at a wavelength of 370 nm is preferably 20% or less, more preferably 10% or less, still more preferably 5% or less. Examples of such an ultraviolet absorber include, but are not limited to, an oxybenzophenone-based compound, a benzotriazole-based compound, a salicylic acid ester-based compound, a benzophenone-based compound, a cyanoacrylate-based compound, a nickel complex salt-based compound, and the above-described polymer ultraviolet absorbing compounds containing an ultraviolet absorbing group. Two or more kinds of ultraviolet absorbers may be used.

In the present invention, the amount of the ultraviolet absorber used is from 0.1 to 5.0 parts by mass, preferably from 0.5 to 4.0 parts by mass, more preferably from 0.8 to 2.5 parts by mass, per 100 parts by mass of the thermoplastic resin used for the light-transmitting substrate.

(Other Additives)

Furthermore, in the composition forming the light-transmitting substrate, other various additives (for example, a deterioration inhibitor (e.g., antioxidant, peroxide decomposing agent, radical inhibitor, metal inactivating agent, acid scavenger, amine), an optical anisotropy controlling agent, a release agent, an antistatic agent and an infrared absorber) according to usage may be added in each preparation step. Such an additive may be either a solid or an oily product. That is, the melting point or boiling point thereof is not particularly limited. As for the infrared absorber, those described, for example, in JP-A-2001-194522 may also be used.

These additives may be added at any timing in the dope preparation step, or a step of adding the additives may be provided as a final preparation step of the dope preparation process. The amount of each material added not particularly limited as long as its function can be exerted. In the case where the light-transmitting substrate is composed of multiple layers, the kind or amount added of the additive may differ among respective layers. This is a conventionally known technique and described, for example, in JP-A-2001-151902. As for these additives including the ultraviolet absorber above, the materials described in detail in *JIII Journal of Technical Disclosure*, No. 2001-1745, pp. 16-22 (issued on Mar. 15, 2001 by Japan Institute of Invention and Innovation) are preferably used.

Such an additive is preferably used in an arbitrary amount within the range of from 0.001 to 20 mass % based on the entire composition constituting the light-transmitting substrate.

<Optical Film>

The optical film of the present invention is obtained by providing a curable resin layer of 0.1 to 15 μm in thickness on surface A of the light-transmitting substrate of the present invention. Also, in the optical film of the present invention, an optical functional layer such as antistatic layer, high refractive index layer and low refractive index layer may be provided on the curable resin layer while not impairing the surface profile specified in the present invention. Furthermore, the curable resin layer may serve also as an antistatic layer or a high refractive index layer.

The curable resin layer is preferably formed by a crosslinking or polymerization reaction of an ionizing radiation-curable compound. For example, a coating composition containing an ionizing radiation-curable polyfunctional monomer or polyfunctional oligomer is coated on the light-transmitting substrate, and a crosslinking or polymerization reaction of the polyfunctional monomer or polyfunctional oligomer is brought about, whereby the curable resin layer can be formed.

The functional group in the ionizing radiation-curable polyfunctional monomer or polyfunctional oligomer is preferably a photo-, electron beam- or radiation-polymerizable functional group, more preferably a photopolymerizable functional group.

Examples of the photopolymerizable functional group include an unsaturated polymerizable functional group such as (meth)acryloyl group, vinyl group, styryl group and allyl group. Among these, a (meth)acryloyl group is preferred.

Also, in the curable resin layer, known additives such as leveling agent, antifouling agent, antistatic agent, refractive index adjusting inorganic filler, scattering particle and thixotropy agent may be used.

Preferred ranges of surface uneven profile and optical properties of the optical film having provided therein the above-described curable resin layer are the same as the ranges of values described for the light-transmitting substrate of the present invention, where the curable resin layer is not provided.

The strength of the optical film having provided therein the curable resin layer is, in the pencil hardness test, preferably H or more, more preferably 2H or more.

In the case where the light-transmitting substrate or optical film of the present invention is used as a protective film of a polarizing plate and adhered to a polarizing film, in view of adhesion to the polarizing film, the light-transmitting substrate or optical film is preferably subjected to a treatment of making the surface hydrophilic, such as acid treatment, alkali treatment, plasma treatment and corona treatment.

In view of adhesion and the like, the surface energy on the surface B side of the light-transmitting substrate is preferably 55 mN/m or more, more preferably from 60 to 75 mN/m. The surface energy can be adjusted by the above-described surface treatment.

<Polarizing Plate>
[Construction of Polarizing Plate]

The light-transmitting substrate of the present invention can be used a protective film in a polarizing plate including a polarizing film and a protective film disposed at least on one side thereof. In producing a polarizing plate by using the light-transmitting substrate of the present invention, surface A is used on the surface side of the polarizing plate and surface B is used on the polarizing film side, whereby objective optical properties of the present invention can be obtained. The light-transmitting substrate of the present invention serves also as a protective film, so that the production cost of the polarizing plate can be reduced. Also, by using the light-transmitting substrate of the present invention on the backlight-side surface, both the front contrast and the reduction of moiré or luminance unevenness can be satisfied.

As for the construction of the polarizing plate, in the embodiment of disposing a protective film on both surfaces of the polarizing film, the light-transmitting substrate of the present invention may be used as one protective film, and a normal cellulose acetate film may be used for the other protective film. A retardation film may also be used for the other protective film.

Furthermore, in the polarizing plate of the present invention, it is also a preferred embodiment that one surface is the light-transmitting substrate of the present invention and the other protective film is an optical compensation film having an optically anisotropic layer composed of a liquid crystalline compound.

(Polarizing Film)

The polarizing film includes an iodine-based polarizing film, a dye-based polarizing film using a dichroic dye, and a polyene-based polarizing film. The iodine-based polarizing film and the dye-based polarizing film can be generally produced using a polyvinyl alcohol-based film.

The polarizing film may be a known polarizing film or a polarizing film cut out from a lengthy polarizing film with the absorption axis of the polarizing film being neither parallel nor perpendicular to the longitudinal direction. The lengthy polarizing film with the absorption axis of the polarizing film being neither parallel nor perpendicular to the longitudinal direction is produced by the following method.

That is, the lengthy polarizing film can be produced by a stretching method where a continuously fed polymer film such as polyvinyl alcohol-based film is stretched at a stretch ratio of 1.1 to 20.0 times at least in the film width direction by applying a tension while holding both edges of the film with holding means and under the condition that the difference in the travelling speed in the longitudinal direction between the holding devices at both edges of the film is within 3%, the film travelling direction is bent in a state of the film being held at both edges to create a tilt angle of 20 to 70° between the film travelling direction at the outlet in the process of holding both edges of the film and the substantial stretching direction of the film. Particularly, a lengthy polarizing film produced with a tilt angle of 45° is preferred in view of productivity.

(Optical Compensation Film)

It is also a preferred embodiment that out of two protective films of the polarizing film, the film other than the light-transmitting substrate (including the optical film) of the present invention is an optical compensation film having an optical compensation layer containing an optically anisotropic layer. The optical compensation film (retardation film) can improve the viewing angle properties on a liquid crystal display screen.

The optical compensation film may be a known optical compensation film, but from the standpoint of widening the viewing angle, the optical compensation film described in JP-A-2001-100042 is preferred.

<Use Mode of the Present Invention>
(Image Display Device)

The light-transmitting substrate or optical film of the present invention is suitably used for an image display device such as liquid crystal display (LCD), plasma display panel (PDP), electroluminescent display (ELD) and cathode ray tube display (CRT).

(Liquid Crystal Display Device)

The light-transmitting substrate, optical film or polarizing plate of the present invention can be advantageously used for an image display device such as liquid crystal display device and is preferably used as the outermost surface layer on the backlight side.

In general, the liquid crystal display device has a liquid crystal cell and two polarizing plates disposed on both sides thereof, and the liquid crystal cell carries a liquid crystal between two electrode base plates. In some cases, one optically anisotropic layer is disposed between the liquid crystal cell and one polarizing plate, or two optically anisotropic layers are disposed, that is, one between the liquid crystal cell and one polarizing plate, and another between the liquid crystal cell and another polarizing plate.

The liquid crystal cell is preferably in TN mode, VA mode, OCB mode, IPS mode or ECB mode.

EXAMPLES

[Production of Light-Transmitting Substrates 101 to 117]

Respective dopes were produced according to the dope formulation shown in Table 1 and simultaneously cast to have a construction shown in Table 2, whereby Light-Transmitting Substrates 101 to 117 were produced. More specifically, respective dopes were simultaneously cast such that the dope on the base material side-1 came to the mirror-finished cooling drum side and gelled by cooling while volatilizing the solvent, and the web was peeled off. The web was then dried with hot air at 100° C. until the residual solvent amount became 10 mass % and further dried with hot air at 140° C. for 10 minutes. The refractive index of the light-transmitting substrate was 1.48 in all samples.

TABLE 1

| Composition (parts by mass) | Dope Species | | | | | | | | | | | | | | | | |
|---|---|---|---|---|---|---|---|---|---|---|---|---|---|---|---|---|---|
| | A | B | C | D | E | F | G | H | I | J | K | L | M | N | P | Q |
| Cellulose Triacetate | 100 | 100 | 100 | 100 | 100 | 100 | 100 | 100 | 100 | 100 | 100 | 100 | 100 | 100 | 100 | 100 |
| Triphenyl phosphate | 12 | 12 | 12 | 12 | 12 | 12 | 12 | 12 | 12 | 12 | 12 | 12 | 12 | 12 | 12 | 12 |
| Ultraviolet absorber | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Fine  Silica particle | 0.1 | — | — | — | — | — | — | — | — | — | — | — | — | — | — | — |
| particle  MX500 | — | — | 4.0 | 9.0 | 12 | 16 | — | — | — | — | — | — | — | — | — | — |

TABLE 1-continued

| Composition (parts by mass) | Dope Species | | | | | | | | | | | | | | | |
|---|---|---|---|---|---|---|---|---|---|---|---|---|---|---|---|---|
| | A | B | C | D | E | F | G | H | I | J | K | L | M | N | P | Q |
| Flat acrylic particle | — | — | — | — | — | — | 9.0 | 12 | 16 | 95 | 26 | 12 | 9.5 | — | — | — |
| Bowl-like particle | — | — | — | — | — | — | — | — | — | — | — | — | — | 12 | — | — |
| SERATH | — | — | — | — | — | — | — | — | — | — | — | — | — | — | 12 | — |
| MICROMICA S1MK | — | — | — | — | — | — | — | — | — | — | — | — | — | — | — | 12 |

TABLE 2

| Sample No. | Dope Formulation | | | | Film Thickness (μm) | | | | Remarks |
|---|---|---|---|---|---|---|---|---|---|
| | Base Material Side-1 | Center | Air Side-1 | Air Side-2 | Base Material Side-1 | Center | Air Side-1 | Air Side-2 | |
| Substrate 101 | A | B | A | — | 5 | 35 | 8 | — | Comparative Example |
| Substrate 102 | A | B | D | — | 5 | 35 | 8 | — | Comparative Example |
| Substrate 103 | A | B | E | — | 5 | 35 | 8 | — | Comparative Example |
| Substrate 104 | A | B | F | — | 5 | 35 | 8 | — | Comparative Example |
| Substrate 105 | A | B | G | — | 5 | 35 | 8 | — | Example |
| Substrate 106 | A | B | H | — | 5 | 35 | 8 | — | Example |
| Substrate 107 | A | B | I | — | 5 | 35 | 8 | — | Example |
| Substrate 108 | A | B | J | — | 5 | 41.2 | 1.8 | — | Comparative Example |
| Substrate 109 | A | B | K | — | 5 | 38.5 | 4.5 | — | Example |
| Substrate 110 | A | B | L | — | 5 | 34 | 9 | — | Example |
| Substrate 111 | A | B | M | — | 5 | 32 | 11 | — | Comparative Example |
| Substrate 112 | A | C | L | — | 5 | 34 | 9 | — | Example |
| Substrate 113 | A | B | N | — | 5 | 35 | 8 | — | Example |
| Substrate 114 | A | B | P | — | 5 | 35 | 8 | — | Example |
| Substrate 115 | A | B | Q | — | 5 | 35 | 4 | — | Example |
| Substrate 116 | A | B | H | A | 5 | 30 | 8 | 5 | Example |
| Substrate 117 | A | B | I | A | 5 | 30 | 8 | 5 | Example |
| Optical Film 118 (A curable resin layer was coated on Substrate 106.) | | | | | | | | | Example |

| Sample No. | L/d Ratio | Frequency of Tilt Angle (%) | | | Sm (μm) | Scattering Angle Distribution I(4°)/I0 | Remarks |
|---|---|---|---|---|---|---|---|
| | | from 0° to less than 1.0° | from 1.0° to less than 10° | 10° or more | | | |
| Substrate 101 | — | 98.1 | 1.2 | 0.7 | — | <0.000 | Comparative Example |
| Substrate 102 | — | 41.5 | 36.5 | 22.0 | 101 | 0.03 | Comparative Example |
| Substrate 103 | — | 26.7 | 45.0 | 28.3 | 92 | 0.05 | Comparative Example |
| Substrate 104 | — | 8.5 | 54.5 | 37.0 | 78 | 0.07 | Comparative Example |
| Substrate 105 | 1.6 | 20.5 | 61.5 | 18.0 | 92 | 0.03 | Example |
| Substrate 106 | 1.6 | 11.3 | 67.6 | 21.1 | 87 | 0.04 | Example |
| Substrate 107 | 1.6 | 6.5 | 69.0 | 24.5 | 80 | 0.05 | Example |
| Substrate 108 | 0.36 | 6 | 52 | 42 | 42 | 0.08 | Comparative Example |
| Substrate 109 | 0.90 | 6.5 | 69.0 | 24.5 | 55 | 0.05 | Example |
| Substrate 110 | 1.8 | 9.0 | 76.5 | 14.5 | 72 | 0.04 | Example |
| Substrate 111 | 2.2 | 27 | 48 | 25 | 110 | 0.03 | Comparative Example |
| Substrate 112 | 1.8 | 9.0 | 76.5 | 14.5 | 72 | 0.04 | Example |
| Substrate 113 | 0.94 | 15.5 | 61.5 | 23.0 | 120 | 0.03 | Example |

TABLE 2-continued

| Substrate 114 | 1.7 | 12.0 | 65.5 | 22.5 | 87 | 0.03 | Example |
| Substrate 115 | 1.8 | 11.8 | 66.2 | 22.0 | 87 | 0.03 | Example |
| Substrate 116 | 1.6 | 18.5 | 70.2 | 11.3 | 90 | 0.04 | Example |
| Substrate 117 | 1.6 | 10.5 | 76.5 | 13.0 | 82 | 0.04 | Example |
| Optical Film 118 | 1.6 | 9.5 | 76.5 | 14.0 | 90 | 0.04 | Example |

In Table 2, the mark "-" in the column of L/d ratio indicates that because of a sample using no flat particle, the long axis length L of a flat particle could not be defined and the calculation was not performed.

The materials used are shown below.

Cellulose Triacetate:

Acetyl substitution degree: 2.86, viscosity average polymerization degree: 310.

Ultraviolet Absorber:

A benzotriazole-based ultraviolet absorber (a 20/40/40 mass % mixture of TINUVIN 326/TINUVIN 328/TINUVIN 329, each produced by Ciba Japan).

Silica Particle:

AEROSIL R972, produced by Nippon Aerosil K.K., primary particle size: about 16 nm.

MX500:

A crosslinked polymethyl methacrylate really spherical particle, average particle size: 5.0 μm, produced by Soken Chemical & Engineering Co., Ltd.

Flat Acrylic Particle:

A resin particle prepared by changing the monomer amount to 1.25 times in "Synthesis 1 of Atypical Particle (when the weight ratio of monomer/seed is 4.0)" of "Example 1" of JP-A-2000-38455; a discotic particle having a long axis length of 5.0 μm and a short axis length of 1.5 μm, and the average aspect ratio is 3.3.

Bowl-Like Acrylic Particle:

A flat particle produced according to Example 4 of JP-A-2002-3517 by changing the kind of the curable monomer to a 7/3 (by mass) mixture of methyl methacrylate/ethylene glycol dimethacrylate; the average long axis length of the particle is 8.5 μm, and the average aspect ratio is 1.3. SERATH:

A hexagonal plate-like α-alumina particle having an average long axis length of 4.6 μm, produced by Kinsei Matec Co., Ltd., average aspect ratio: 4.8.

MICROMICA:

A mica particle having an average long axis length of 2.2 μm, MICROMICA S1MK, produced by CORP-CHEMICAL K.K., average aspect ratio: 4.0.

Incidentally, the solid content concentration was adjusted with a 90:10 (by mass) mixed solvent of methylene chloride: methanol to 23 mass % for the dope in the center and 18 mass % for the dopes on the base material side and the air side.

[Production of Optical Film 118]

(Preparation of Coating Solution for Curable Resin Layer)

The components shown below are charged into a mixing tank and after stirring, the resulting solution was filtered through a polypropylene-made filter having a pore size of 30 μm to prepare the coating solution.

Coating Solution (HCL-1) for Curable Resin Layer:

| PET-30 | 48.5 parts by mass |
| IRGACURE 127 | 1.5 parts by mass |
| Methyl isobutyl ketone | 35.0 parts by mass |
| Methyl ethyl ketone | 15.0 parts by mass |

The components above are as follows.

PET-30:

A mixture of pentaerythritol triacrylate and pentaerythritol tetraacrylate [produced by Nippon Kayaku Co., Ltd.].

IRGACURE 127:

A polymerization initiator produced by Ciba Specialty Chemicals Corp.

(Coating of Curable Resin Layer)

Using the slot die coater shown in FIG. 1 of JP-A-2003-211052, Coating Solution (HCL-1) for Curable Resin Layer was coated on Light-Transmitting Substrate 106 to contain a nonvolatile component in an amount of 1.0 g/m$^2$, and dried at 30° C. for 15 seconds and further at 90° C. for 20 seconds. Thereafter, the coating layer was cured by irradiating an ultraviolet ray at an irradiation dose of 70 mJ/cm$^2$ with "Air-Cooled Metal Halide Lamp" {manufactured by Eye Graphics Co., Ltd.} of 160 W/cm under nitrogen purging to produce Optical Film 118. The curable resin layer was coated on the surface of the air side-1 side. The thickness of the curable resin layer was about 0.8 μm.

[Production of Image Display Device]

A notebook PC(R700-XP50K) manufactured by LG Display was disassembled, the upper diffusion sheet disposed between the backlight and the liquid crystal panel was removed, the backlight-side polarizing plate protective film laminated to the liquid crystal cell was separated, and instead, each of Light-Transmitting Substrates 101 to 117 and Optical Film 118 was laminated with a pressure-sensitive adhesive.

[Evaluation of Light-Transmitting Substrate, Optical Film and Image Display Device Using the Substrate or Optical Film]

Light-Transmitting Substrates 101 to 117 (Substrates 101 to 117) and Optical Film 118 produced were subjected to the following evaluations.

(1) Measurement of Tilt Angle Distribution Profile

Using Model SXM520-AS150 manufactured by Micromap Corp. (U.S.A.), the surface A surface of the light-transmitting substrate and the surface of the optical film on the side where the curable resin layer was coated, were measured. A halogen lamp having inserted thereinto an interference filter at a center wavelength of 560 nm was used as the light source, the magnification of the objective lens was 10 times, and the data was retrieved by a ⅔ inch CCD having a pixel number of 640×480. As a result, the measurement pitch in the longitudinal and transverse directions was 1.3 micrometers, the measurement unit of the tilt angle was 0.8 square micrometers, and the measurement area was 500,000 square micrometers (0.5 square millimeters).

The tilt angle was computed from the height data at 3 points which are a measurement unit, and from all measurement data, the integral value of frequencies of each of title angle components with a tilt angle of from 0° to less than 1.0°, from 1.0° to less than 10.0°, or 10° or more was determined.

(2) Measurement of Average Distance Sm of Unevenness

The average distance Sm of unevenness was measured using SURFCORDER MODEL SE-3F manufactured by Kosaka Laboratory Ltd. in accordance with JIS-B0601 (1982).

(3) Measurement of Light Scattering Profile

The measurement was performed using a goniophotometer (GP-5, manufactured by Murakami Color Research Laboratory) under the conditions that the light source was convergent light at an angle of 1:5° and the light-receiving angle of the detector was 2°. Light was caused to enter from the normal direction of the obtained light-transmitting substrate or optical film, and the quantity of transmitted scattered light was measured by continuously changing the angle in the plane containing the film (or substrate) normal line, whereby a light scattering profile was obtained. As for the quantity of transmitted scattered light, the quantity of light of the light source, in a state of having no film (or substrate), was taken as 1.

(4) Moiré

Signals were input into the produced liquid crystal display device from a video signal generator (VG-848, manufactured by ASTRODESIGN, Inc.) and by displaying an entirely solid display of 128/256 gradation gray display, the screen was observed with an eye from various directions in dark room to evaluate the presence or absence of moiré generation.

A: Moiré is not observed.
B: Moiré is slightly observed but not annoying.
C: Moiré is weakly observed and slightly annoying.
D: Moiré is clearly observed.

(5) Front White Luminance

The liquid crystal display device was displayed in an entirely solid display of 256/256 gradation white display by the same method as in the evaluation of moiré, and luminance was measured by a luminance meter (BM5-A, manufactured by TOPCON Corp.) from the normal (front) direction of the liquid crystal display device plane in dark room. The center point of the screen, 1 point in each of up and down directions, and 1 point in each of left and right directions, at intervals of 3 cm from the center point, that is, 5 points in total, were measured, and the average value was calculated. Based on the luminance when using no light-scattering film on the surface of the backlight-side polarizing plate, the sample was evaluated on the following 4-grade scale.

A: Not decreased at all (99% or more of the reference value).
B: Scarcely decreased (from 98% to less than 99% or more of the reference value).
C: Slightly decreased (from 95% to less than 98% or more of the reference value).
D: Decreased (less than 95% of the reference value).

(6) Luminance Non-Uniformity

The liquid crystal display device was displayed in an entirely solid display of 128/256 gradation gray display by the same method as in the evaluation of moiré, and luminance was measured by a luminance meter (BM5-A, manufactured by TOPCON Corp.) from the normal (front) direction of the liquid crystal display device plane in dark room. A 8-cm region from the center point of the screen each in the left and right directions was measured in steps of 0.5 cm, and [difference between maximum value and minimum value of luminance in a 3-cm region consisting of adjacent segments]÷[average value of luminance in a 3-cm region consisting of adjacent segments]×100 was taken as the luminance non-uniformity (%). The luminance non-uniformity is indicative of the following: when it is 3% or less, most persons do not perceive non-uniformity; when from more than 3% to 6%, some persons perceive non-uniformity; and when exceeds 10%, most persons perceive non-uniformity. From a commercial standpoint, the luminance non-uniformity needs to be 10% or less.

Evaluation results of each sample and the display performance when the sample was used as the backlight-side polarizing plate protective film of a liquid crystal display device are shown in Table 3.

TABLE 3

| Sample No. | Moiré | Luminance Non-Uniformity | Front White Luminance | Remarks |
|---|---|---|---|---|
| Substrate 101 | D | 18 | A | Comparative Example |
| Substrate 102 | D | 14 | B | Comparative Example |
| Substrate 103 | C | 11 | C | Comparative Example |
| Substrate 104 | B | 8 | D | Comparative Example |
| Substrate 105 | B | 8 | A | Example |
| Substrate 106 | A | 6 | A | Example |
| Substrate 107 | A | 4 | B | Example |
| Substrate 108 | A | 3 | D | Comparative Example |
| Substrate 109 | A | 4 | B | Example |
| Substrate 110 | A | 4 | A | Example |
| Substrate 111 | D | 13 | B | Comparative Example |
| Substrate 112 | A | 3 | A | Example |
| Substrate 113 | A | 6 | B | Example |
| Substrate 114 | B | 8 | A | Example |
| Substrate 115 | A | 6 | B | Example |
| Substrate 116 | A | 4 | A | Example |
| Substrate 117 | A | 3 | A | Example |
| Optical Film 118 | A | 3 | A | Example |

As seen from Table 3, when the light-transmitting substrate using a flat particle within the scope of the present invention is used as the backlight-side polarizing plate protective film of a liquid crystal display device, an image display device assured of high luminance uniformity and free from reduction in the white luminance at the front and generation of moiré can be obtained.

The absolute value of the angle between the long axis of the flat particle and the plane of the light-transmitting substrate was evaluated using a slice of Light-Transmitting Substrate 106 and found to be about 6° on average, and most of flat particles were aligned in the planar direction of the light-transmitting substrate, suggesting that the flat particle is effectively acting for the formation of the preferred surface configuration of the present invention.

Above all, in the light-transmitting substrate produced using the flat particle in a dope for the second layer from the air side (Substrates 116 and 117) or Optical Film 118 obtained by providing a curable resin layer on the flat particle-containing light-transmitting substrate, the tilt angle distribution of the surface can decrease the frequency of 10° or more, revealing that these have excellent performance.

Out of the light-transmitting substrates of the present invention, the tilt angle distribution and haze of a substrate particularly excellent in the ability of canceling the moiré or luminance non-uniformity were evaluated, as a result, the substrate was found to have a low integral value of frequencies of from 0° to less than 0.5°, a high integral value of frequencies of from 3° to less than 8°, and an appropriate haze (integral value of frequencies of from 0° to less than 0.5° (Substrate 105/Substrate 106=9.9/5.7), integral value of frequencies of from 3° to less than 8° (Substrate 105/Substrate 106=28.0/39.4), internal haze (Substrate 105/Substrate 106=1.0/1.4), surface haze (Substrate 105/Substrate 106=19/26)).

[Production of Translucent Particle]

In a reaction vessel equipped with a stirrer and a reflux condenser, 600 parts by mass of water was filled, and 0.7 parts by mass of polyvinyl alcohol and 2.7 parts by mass of sodium dodecylbenzenesulfonate were added thereto and dissolved. Subsequently, a mixed solution containing 95.0 parts by mass of methyl methacrylate as a monofunctional monomer, 5.0 parts by mass of ethylene glycol dimethacrylate as a crosslinkable monomer, and 2.0 parts by mass of benzoyl peroxide was added thereto and stirred. The resulting mixed solution was dispersed using a homogenizer at 4,500 rpm for 15 minutes and thereby made uniform. Furthermore, stirring was continued at 75° C. for 4 hours while blowing a nitrogen gas. The reaction product was lightly dehydrated by centrifugation, washed with water and dried. The obtained crosslinkable methyl methacrylate-based Resin Particle (Z-1) was really spherical and had an average particle diameter of 5 μm and a refractive index of 1.50.

Crosslinkable resin particles were prepared by changing the kind or amount (unit: parts by mass) of the monofunctional monomer or the kind or amount of the crosslinkable monomer in the production of Translucent Particle Z-1. The particle diameter of the particle was adjusted by changing the rotation speed of the homogenizer.

The kind and amount of each of monomers and characteristic values of the particle prepared are shown in Table 4.

In Table 4, the swelling ratio indicates a swelling ratio when a toluene 30 mass % liquid dispersion was prepared and the change with aging of the particle diameter was stopped. The calculating formula is as described above.

Incidentally, Particle Z-1 and Particle Z-4 were not evaluated for the production of dope and the production of a light-transmitting substrate, because the particle was dissolved in the evaluation of swelling ratio.

TABLE 4

| | | Z-1 | Z-2 | Z-3 | Z-4 | Z-5 | Z-6 | Z-7 | Z-8 | Z-9 | Z-10 | Z-11 | Z-12 | Z-13 |
|---|---|---|---|---|---|---|---|---|---|---|---|---|---|---|
| Mono-functional Monomer | Methyl methacrylate | 95 | 92 | 60 | 99.1 | 46 | 75 | 75 | 75 | 75 | — | — | — | — |
| | Styrene | — | — | — | — | — | 20 | 20 | 20 | 20 | 99.1 | 95 | 88 | 60 |
| | Ethyl methacrylate | — | — | — | — | 46 | — | — | — | — | — | — | — | — |
| Cross-linkable Monomer | Ethylene glycol dimethacrylate | 5 | 8 | 40 | 0.9 | 8 | 4 | 4 | 4 | 4 | — | — | — | — |
| | Divinylbenzene | — | — | — | — | — | 1 | 1 | 1 | 1 | 0.9 | 5 | 12 | 40 |
| Average Particle Diameter (μm) | | 5 | 5 | 5 | 5 | 5 | 3 | 5 | 8 | 15 | 8 | 8 | 8 | 8 |
| Reflux index | | 1.50 | 1.50 | 1.50 | 1.50 | 1.50 | 1.52 | 1.52 | 1.52 | 1.52 | 1.60 | 1.60 | 1.60 | 1.60 |
| Swelling ratio (vol %) | | 65 | 26 | 6 | dissolved, unmeasurable | 32 | 68 | 68 | 68 | 68 | dissolved, unmeasurable | 72 | 24 | 7 |
| Crosslinkable monomer content (mass %) | | 5 | 8 | 40 | 1 | 8 | 5 | 5 | 5 | 5 | 1 | 5 | 12 | 40 |

[Production of Light-Transmitting Substrate]

Respective dopes were produced according to the dope formulation shown in Table 5 and simultaneously cast to have a construction shown in Table 6, whereby Light-Transmitting Substrates 201 to 223 were produced. As for Substrates 205 to 215 and 217 to 223, the crosslinkable particle was deformed at the casting. The dopes were cast such that the dope on the base material side-1 came to the mirror-finished cooling drum side and gelled by cooling while volatilizing the solvent, and the web was peeled off. The web was then dried with hot air at 100° C. until the residual solvent amount became 10 mass % and further dried with hot air at 140° C. for 10 minutes. The refractive index of the light-transmitting substrate was 1.48 in all samples.

As for Light-Transmitting Substrates 222 and 223, in the production of Light-Transmitting Substrates 220 to 221, the web peeled off was stretched at 100° C. to 1.22 times in each of longitudinal and transverse directions at the time of the residual solvent amount reaching 30 mass %, then dried with hot air at 100° C. until the residual solvent amount became 10 mass %, and further dried with hot air at 140° C. for 10 minutes. These light-transmitting substrates were adjusted to a film thickness of 40 μm by this stretching.

TABLE 5

| Composition (solid content ratio, parts by mass) | | A | B | C | D | E | F | G | H | I | J | K | L | M | N | P | Q | R | S |
|---|---|---|---|---|---|---|---|---|---|---|---|---|---|---|---|---|---|---|---|
| Cellulose triacetate | | 100 | 100 | 100 | 100 | 100 | 100 | 100 | 100 | 100 | 100 | 100 | 100 | 100 | 100 | 100 | 100 | 100 | 100 |
| Triphenyl phosphate | | 12 | 12 | 12 | 12 | 12 | 12 | 12 | 12 | 12 | 12 | 12 | 12 | 12 | 12 | 12 | 12 | 12 | 12 |
| Ultraviolet absorber | | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Fine Particle | Silica particle | 0.1 | — | — | — | — | — | — | — | — | — | — | — | — | — | — | — | — | — |
| | Z-1 | — | — | — | — | — | — | 9.0 | 12 | 16 | — | — | — | — | — | — | — | — | — |
| | Z-2 | — | — | — | — | — | — | — | — | — | 12 | — | — | — | — | — | — | — | — |
| | Z-3 | — | — | 4.0 | 9.0 | 12 | 16 | — | — | — | — | — | — | — | — | — | — | — | — |
| | Z-5 | — | — | — | — | — | — | — | — | — | — | 12 | — | — | — | — | — | — | — |
| | Z-6 | — | — | — | — | — | — | — | — | — | — | — | 12 | — | — | — | — | — | — |
| | Z-7 | — | — | — | — | — | — | — | — | — | — | — | — | 12 | — | — | — | — | — |
| | Z-8 | — | — | — | — | — | — | — | — | — | — | — | — | — | 12 | — | — | — | — |
| | Z-9 | — | — | — | — | — | — | — | — | — | — | — | — | — | — | 12 | — | — | — |
| | Z-11 | — | — | — | — | — | — | — | — | — | — | — | — | — | — | — | 12 | — | — |
| | Z-12 | — | — | — | — | — | — | — | — | — | — | — | — | — | — | — | — | 12 | — |
| | Z-13 | — | — | — | — | — | — | — | — | — | — | — | — | — | — | — | — | — | 12 |

TABLE 6

| | Dope Formulation | | | | Film Thickness (μm) | | | | |
|---|---|---|---|---|---|---|---|---|---|
| Sample No. | Base Material Side-1 | Center | Air Side-1 | Air Side-2 | Base Material Side-1 | Center | Air Side-1 | Air Side-2 | Remarks |
| Substrate 201 | A | B | A | — | 5 | 35 | 8 | — | Comparative Example |
| Substrate 202 | A | B | D | — | 5 | 35 | 8 | — | Comparative Example |
| Substrate 203 | A | B | E | — | 5 | 35 | 8 | — | Comparative Example |
| Substrate 204 | A | B | F | — | 5 | 35 | 8 | — | Comparative Example |
| Substrate 205 | A | B | G | — | 5 | 35 | 8 | — | Invention |
| Substrate 206 | A | B | H | — | 5 | 35 | 8 | — | Invention |
| Substrate 207 | A | B | I | — | 5 | 35 | 8 | — | Invention |
| Substrate 208 | A | B | J | — | 5 | 35 | 8 | — | Invention |
| Substrate 209 | A | B | K | — | 5 | 35 | 8 | — | Invention |
| Substrate 210 | A | B | L | — | 5 | 35 | 8 | — | Invention |
| Substrate 211 | A | B | M | — | 5 | 35 | 8 | — | Invention |
| Substrate 212 | A | B | N | — | 5 | 25 | 10 | — | Invention |
| Substrate 213 | A | B | P | — | 5 | 25 | 20 | — | Invention |
| Substrate 214 | A | B | Q | — | 5 | 35 | 8 | — | Invention |
| Substrate 215 | A | B | R | — | 5 | 35 | 8 | — | Invention |

TABLE 6-continued

| | | | | | | | | | |
|---|---|---|---|---|---|---|---|---|---|
| Substrate 216 | A | B | S | — | 5 | 35 | 8 | — | Example |
| Substrate 217 | A | C | H | — | 5 | 25 | 8 | — | Invention |
| Substrate 218 | A | B | J | A | 5 | 25 | 8 | 5 | Invention |
| Substrate 219 | A | B | I | A | 5 | 25 | 8 | 5 | Invention |
| Substrate 220 | A | B | G | — | 5 | 43 | 12 | — | Invention |
| Substrate 221 | A | B | I | A | 5 | 35 | 12 | 5 | Invention |
| Substrate 222 | A | B | G | — | * | * | * | * | Invention |
| Substrate 223 | A | B | I | A | * | * | * | * | Invention |
| Optical Film 224 (A curable resin layer was coated on Substrate 206.) | | | | | | | | | Invention |

| Sample No. | Aspect Ratio of Particle in Substrate | Frequency of Tilt Angle (%) from 0° to less than 1.0° | Frequency of Tilt Angle (%) from 1.0° to less than 10° | Frequency of Tilt Angle (%) 10° or more | Sm (μm) | Scattering Angle Distribution $I(4°)/I0$ | Remarks |
|---|---|---|---|---|---|---|---|
| Substrate 201 | — | 98.1 | 1.2 | 0.7 | — | <0.000 | Comparative Example |
| Substrate 202 | 1.0 | 41.4 | 36.6 | 22.0 | 105 | 0.03 | Comparative Example |
| Substrate 203 | 1.0 | 26.5 | 45.4 | 28.1 | 94 | 0.05 | Comparative Example |
| Substrate 204 | 1.0 | 8.8 | 54.7 | 36.5 | 78 | 0.07 | Comparative Example |
| Substrate 205 | 1.6 | 21.5 | 61.8 | 18.0 | 95 | 0.03 | Invention |
| Substrate 206 | 1.6 | 11.3 | 67.6 | 21.1 | 85 | 0.04 | Invention |
| Substrate 207 | 1.6 | 6.6 | 69.2 | 24.2 | 76 | 0.05 | Invention |
| Substrate 208 | 1.2 | 11.6 | 64.9 | 23.5 | 86 | 0.04 | Invention |
| Substrate 209 | 1.8 | 18.4 | 70.2 | 11.4 | 75 | 0.04 | Invention |
| Substrate 210 | 1.6 | 9.6 | 66.9 | 23.5 | 65 | 0.05 | Invention |
| Substrate 211 | 1.6 | 12.8 | 67.2 | 20.0 | 83 | 0.04 | Invention |
| Substrate 212 | 1.6 | 13.5 | 69.8 | 16.7 | 89 | 0.04 | Invention |
| Substrate 213 | 1.6 | 16.5 | 67.0 | 16.5 | 100 | 0.03 | Invention |
| Substrate 214 | 1.6 | 14.4 | 67.4 | 18.2 | 81 | 0.05 | Invention |
| Substrate 215 | 1.2 | 11.2 | 64.9 | 23.9 | 86 | 0.05 | Invention |
| Substrate 216 | 1.0 | 26.3 | 45.4 | 28.3 | 89 | 0.07 | Example |
| Substrate 217 | 1.6 | 11.2 | 65.3 | 23.5 | 86 | 0.05 | Invention |
| Substrate 218 | 1.2 | 10.4 | 70.2 | 19.4 | 90 | 0.04 | Invention |
| Substrate 219 | 1.6 | 10.5 | 76.5 | 13.0 | 82 | 0.04 | Invention |
| Substrate 220 | 1.6 | 21.5 | 61.8 | 18.0 | 95 | 0.05 | Invention |
| Substrate 221 | 1.6 | 11.3 | 67.6 | 21.1 | 85 | 0.05 | Invention |
| Substrate 222 | 2.4 | 5.8 | 70.2 | 24.0 | 78 | 0.04 | Invention |
| Substrate 223 | 2.4 | 5.5 | 72.5 | 22.0 | 69 | 0.04 | Invention |
| Optical Film 224 | | 9.5 | 76.3 | 14.2 | 88 | 0.04 | Invention |

The materials used are shown below.
Cellulose Triacetate:
  Acetyl substitution degree: 2.86, viscosity average polymerization degree: 310.
Ultraviolet Absorber:
  A benzotriazole-based ultraviolet absorber (a 20/40/40 mass % mixture of TINUVIN 326/TINUVIN 328/TINUVIN 329, each produced by Ciba Japan).
Silica Particle:
  AEROSIL R972, produced by Nippon Aerosil K.K., primary particle size: about 16 nm.

Incidentally, the solid content concentration was adjusted with a 90:10 (by mass) mixed solvent of methylene chloride: methanol to 22 mass % for the base layer dope and 17 mass % for the surface layer dope.

[Production of Optical Film 224]
[Preparation of Coating Solution for Curable Resin Layer]
The components shown below are charged into a mixing tank and after stirring, the resulting solution was filtered through a polypropylene-made filter having a pore size of 30 μm to prepare the coating solution.

Coating Solution (HCL-1) for Curable Resin Layer:

| | |
|---|---|
| PET-30 | 48.5 parts by mass |
| IRGACURE 127 | 1.5 parts by mass |
| Methyl isobutyl ketone | 35.0 parts by mass |
| Methyl ethyl ketone | 15.0 parts by mass |

The components above are as follows.
PET-30:
  A mixture of pentaerythritol triacrylate and pentaerythritol tetraacrylate [produced by Nippon Kayaku Co., Ltd.].
IRGACURE 127:
  A polymerization initiator produced by Ciba Specialty Chemicals Corp.
[Coating of Curable Resin Layer]
Using the slot die coater shown in FIG. 1 of JP-A-2003-211052, Coating Solution (HCL-1) for Curable Resin Layer was coated on Light-Transmitting Substrate 206 to contain a nonvolatile component in an amount of 1.0 g/m², and dried at 30° C. for 15 seconds and further at 90° C. for 20 seconds.

Thereafter, the coating layer was cured by irradiating an ultraviolet ray at an irradiation dose of 70 mJ/cm² with "Air-Cooled Metal Halide Lamp" {manufactured by Eye Graphics Co., Ltd.} of 160 W/cm under nitrogen purging to produce Optical Film 224. The curable resin layer was coated on the surface formed using the air side-1 dope. The thickness of the curable resin layer was about 0.8 µm.

[Production of Image Display Device]

A notebook PC(R700-XP50K) manufactured by LG Display was disassembled, the upper diffusion sheet disposed between the backlight and the liquid crystal panel was removed, the backlight-side polarizing plate protective film laminated to the liquid crystal cell was separated, and instead, each of Light-Transmitting Substrates 201 to 223 and Optical Film 224 was laminated with a pressure-sensitive adhesive.

[Evaluation of Light-Transmitting Substrate, Optical Film and Image Display Device Using the Substrate or Optical Film]

Light-Transmitting Substrates (Substrate 201) to (Substrate 223) and Optical Film 224 produced were evaluated in the same manner as the evaluations of Light-Transmitting Substrates 101 to 117 and Optical Film 118.

(1) Measurement of Tilt Angle Distribution Profile
(2) Measurement of Average Distance Sm of Unevenness
(3) Measurement of Light Scattering Profile
(4) Moiré
(5) Front White Luminance
(6) Luminance Non-Uniformity Evaluation results of each sample and the display performance when the sample was used as the backlight-side polarizing plate protective film of a liquid crystal display device are shown in Table 7.

TABLE 7

| Sample No. | Moiré | Luminance Non-Uniformity | Front White Luminance | Remarks |
|---|---|---|---|---|
| Substrate 201 | D | 18 | A | Comparative Example |
| Substrate 202 | D | 14 | B | Comparative Example |
| Substrate 203 | C | 11 | C | Comparative Example |
| Substrate 204 | B | 8 | D | Comparative Example |
| Substrate 205 | B | 8 | A | Invention |
| Substrate 206 | A | 6 | A | Invention |
| Substrate 207 | A | 4 | B | Invention |
| Substrate 208 | B | 8 | B | Invention |
| Substrate 209 | A | 6 | A | Invention |
| Substrate 210 | B | 5 | B | Invention |
| Substrate 211 | A | 5 | A | Invention |
| Substrate 212 | A | 6 | A | Invention |
| Substrate 213 | A | 8 | A | Invention |
| Substrate 214 | A | 6 | A | Invention |
| Substrate 215 | B | 8 | B | Invention |
| Substrate 216 | C | 11 | C | Comparative Example |
| Substrate 217 | A | 4 | A | Invention |
| Substrate 218 | A | 4 | A | Invention |
| Substrate 219 | A | 3 | A | Invention |
| Substrate 220 | B | 3 | B | Invention |
| Substrate 221 | A | 3 | B | Invention |
| Substrate 222 | A | 3 | A | Invention |
| Substrate 223 | A | 3 | A | Invention |
| Optical Film 224 | A | 3 | A | Invention |

As seen from Table 7, when the light-transmitting substrate containing a flat particle of the present invention is used as the backlight-side polarizing plate protective film of a liquid crystal display device, an image display device assured of high luminance uniformity and free from reduction in the white luminance at the front and generation of moiré can be obtained. The absolute value of the angle between the long axis of the flat particle and the plane of the light-transmitting substrate was evaluated using a slice of Light-Transmitting Substrate 206 and found to be about 5° on average, and most of flat particles were aligned in the planar direction of the light-transmitting substrate, revealing that the flat particle is effectively acting for the formation of the preferred surface configuration of the present invention.

Out of the light-transmitting substrates of the present invention, the tilt angle distribution and haze of each of Substrates 205, 209 and 211 particularly excellent in the ability of canceling the moiré or luminance non-uniformity were evaluated, as a result, the substrates were found to have a low integral value of frequencies of from 0° to less than 0.5°, a high integral value of frequencies of from 3° to less than 8°, and an appropriate haze as shown in Table 8 below.

TABLE 8

| | Integral Value of Frequencies of Tilt Angle of From 0° To Less Than 0.5° (%) | Integral Value of Frequencies of Tilt Angle of From 3° To Less Than 8° (%) | Internal Haze (%) | Surface haze (%) |
|---|---|---|---|---|
| Substrate 205 | 10.0 | 28.1 | 1.0 | 18 |
| Substrate 209 | 5.8 | 39.2 | 1.3 | 27 |
| Substrate 211 | 6.0 | 36.2 | 6.8 | 22 |

Also, in the light-transmitting substrate produced using the flat particle in a dope for the second layer from the air side (Substrates 218 and 219) or Optical Film 224 obtained by providing a curable resin layer on the flat particle-containing light-transmitting substrate, the tilt angle distribution of the surface can decrease the frequency of 10° or more, revealing that these have excellent performance.

In addition, the haze before and after storage at 90° C. for 800 hours was measured as the durability evaluation of the light-transmitting substrate. The haze of Substrate 203 containing a particle having a high crosslinkable monomer content of 40% was increased by 5%, but the change of haze was as small as about 1% in Substrate 208 containing a particle having a crosslinkable monomer content of 8% and that of Substrate 209 containing a particle having a crosslinkable monomer content of 8% and using ethyl methacrylate having a glass transition temperature of 65° C. in combination was less than 1%, revealing that these substrates have good durability.

The present invention is usable as a polarizing plate protective film on the backlight side of a liquid crystal display device, ensures high front white luminance that is at the same time uniform in the screen, and is capable of suppressing an interference fringe such as moiré and responding to the thickness reduction.

What is claimed is:

1. A light-transmitting substrate having an uneven profile on at least one surface, wherein
    the light-transmitting substrate comprises a thermoplastic resin and a flat translucent particle;
    a tilt angle of the uneven profile on at least one surface of the light-transmitting substrate has the following distribution:
    (a) an integral value of frequencies of from 0° to less than 1.0° is from 0% to less than 25%,
    (b) an integral value of frequencies of from 1.0° to less than 10° is from 60% to less than 100%, and
    (c) an integral value of frequencies of 10° or more is from 0% to less than 25%,
and
    an average distance between trough and crest in the uneven profile is from 10 to 300 μm.

2. The light-transmitting substrate as claimed in claim 1, wherein the flat particle satisfies the following condition:

$$0.40 \leq L/d \leq 1.90 \qquad (f)$$

wherein L and d indicate the followings:
    L: a thickness of flat particle-containing region in the light-transmitting substrate, and
    d: a long axis length of the flat particle.

3. The light-transmitting substrate as claimed in claim 2, wherein the flat translucent particle has an aspect ratio of from 1.2 to 50 and the long axis length is from 1.5 to 50 μm.

4. The light-transmitting substrate as claimed in claim 2, wherein scattering angle distribution of the light-transmitting substrate satisfies the following condition:

$$I(4°)/I0 = \text{from } 0.02 \text{ to } 0.06 \qquad (g)$$

wherein I(4°) and I0 each is an intensity of outgoing light transmitted through the light-transmitting substrate when light is caused to enter from normal direction of the light-transmitting substrate, I(4°) is the outgoing light intensity at a position inclined at 4° from the normal line of the light-transmitting substrate when the light-transmitting substrate comprises the translucent particle, and I0 is the outgoing light intensity in the normal direction of the light-transmitting substrate when the light-transmitting substrate does not comprise the translucent particle.

5. The light-transmitting substrate as claimed in claim 2, wherein a haze value attributable to interior is from 0.1 to 35% and a haze value attributable to surface is from 3 to 40%.

6. An optical film comprising a curable resin layer having a thickness of from 0.1 to 15 μm and the light-transmitting substrate as claimed in claim 2.

7. A polarizing plate comprising a polarizing film and a protective film, wherein the protective film is the light-transmitting substrate as claimed in claim 1.

8. An image display device comprising the light-transmitting substrate as claimed in claim 1.

9. The light-transmitting substrate as claimed in claim 1, wherein the flat translucent particle is a crosslinkable flat translucent particle having an average aspect ratio of from 1.2 to 50, the flat translucent particle comprises a copolymer of a monofunctional monomer and a crosslinkable monomer, and a ratio of the crosslinkable monomer to all monomers of the copolymer is from 1 to 25 mass %.

10. The light-transmitting substrate as claimed in claim 1, wherein the flat translucent particle is a crosslinkable flat translucent particle having an average aspect ratio of from 1.2 to 50, the flat translucent particle comprises a copolymer of a monofunctional monomer and a crosslinkable monomer, and an expansion coefficient of the flat translucent particle in toluene is from 20 to 100 vol %.

11. The light-transmitting substrate as claimed in claim 1, wherein the flat translucent particle is a crosslinkable flat translucent particle having an average aspect ratio of from 1.2 to 50, the flat translucent particle comprises a copolymer of a monofunctional monomer and a crosslinkable monomer, a ratio of the crosslinkable monomer to all monomers of the copolymer is from 1 to 25 mass %, and an expansion coefficient of the flat translucent particle in toluene is from 20 to 100 vol %.

12. The light-transmitting substrate as claimed in claim 9, wherein scattering angle distribution of the light-transmitting substrate satisfies the following condition:

$$I(4°)/I0 = \text{from } 0.02 \text{ to } 0.06 \qquad (g)$$

wherein I(4°) and I0 each is an intensity of outgoing light transmitted through the light-transmitting substrate when light is caused to enter from a normal direction of the light-transmitting substrate, I(4°) is the outgoing light intensity at a position inclined at 4° from the normal line of the light-transmitting substrate when the light-transmitting substrate comprises the translucent particle, and I0 is the outgoing light intensity in the normal direction of the light-transmitting substrate when the light-transmitting substrate does not comprise the translucent particle.

13. The light-transmitting substrate as claimed in claim 9, wherein the haze value attributable to interior is from 0.1 to 35% and a haze value attributable to surface is from 3 to 40%.

14. The light-transmitting substrate as claimed in claim 9, wherein the monofunctional monomer is an aromatic monovinyl compound, a vinyl cyanide compound, an acrylic acid ester monomer, a methacrylic acid ester monomer, a mono- or di-carboxylic acid, an acid anhydride of a dicarboxylic acid, an amide-based monomer, a vinyl acetate, a hydroxyethyl vinyl ether or a hydroxybutyl vinyl ether.

15. The light-transmitting substrate as claimed in claim 9, wherein the crosslinkable monomer is an aromatic monomer, an oxygen-containing monomer, a sulfur-containing monomer, an aliphatic monomer, or an ester compound of a polyhydric alcohol and an acrylic acid or methacrylic acid.

16. An optical film comprising a curable resin layer having a thickness of from 0.1 to 15 μm and the light-transmitting substrate as claimed in claim 9.

* * * * *